US012410381B2

(12) United States Patent
Miracle et al.

(10) Patent No.: US 12,410,381 B2
(45) Date of Patent: Sep. 9, 2025

(54) PARTICULATE LAUNDRY ADDITIVE

(71) Applicant: The Procter & Gamble Company, Cincinnati, OH (US)

(72) Inventors: Gregory Scot Miracle, Liberty Township, OH (US); Daniel Dale Ditullio, Jr., Hamilton, OH (US); Thuy T Nguyen-Meyer, West Chester, OH (US); Mauricio Trujillo, Cincinnati, OH (US); Jaden Scott Zerhusen, Florence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 717 days.

(21) Appl. No.: 17/331,785

(22) Filed: May 27, 2021

(65) Prior Publication Data

US 2021/0380905 A1 Dec. 9, 2021

Related U.S. Application Data

(60) Provisional application No. 63/169,391, filed on Apr. 1, 2021, provisional application No. 63/034,766, filed on Jun. 4, 2020.

(51) Int. Cl.

| | |
|---|---|
| ***C11D 17/00*** | (2006.01) |
| ***C11D 3/00*** | (2006.01) |
| ***C11D 3/20*** | (2006.01) |
| ***C11D 3/37*** | (2006.01) |
| ***C11D 3/50*** | (2006.01) |
| ***C11D 11/00*** | (2006.01) |
| ***C11D 17/06*** | (2006.01) |

(52) U.S. Cl.

CPC .......... *C11D 3/0084* (2013.01); *C11D 3/0068* (2013.01); *C11D 3/2034* (2013.01); *C11D 3/2058* (2013.01); *C11D 3/2093* (2013.01); *C11D 3/3707* (2013.01); *C11D 3/50* (2013.01); *C11D 17/06* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 4,853,143 | A | 8/1989 | Hardy et al. |
| 5,854,200 | A | 12/1998 | Severns |
| 7,871,976 | B1 | 1/2011 | Aouad |
| 8,476,219 | B2 | 7/2013 | Aouad |
| 9,347,022 | B1 | 5/2016 | Frentzel et al. |
| 9,453,188 | B2 | 9/2016 | Brown et al. |
| 9,453,189 | B2 | 9/2016 | Aouad |
| 9,708,574 | B2 | 7/2017 | Aouad |
| 9,714,401 | B2 | 7/2017 | Frankenbach |
| 9,763,860 | B2 | 9/2017 | Sodd et al. |
| 9,878,467 | B2 | 1/2018 | Huddleston et al. |
| 10,000,727 | B2 | 6/2018 | Sodd |
| 10,160,936 | B2 | 12/2018 | Brown et al. |
| 10,167,441 | B2 | 1/2019 | Aouad |
| 10,196,593 | B2 | 2/2019 | Zerhusen et al. |
| 10,240,108 | B2 | 3/2019 | Frankenbach et al. |
| 10,301,579 | B2 | 5/2019 | Dykstra et al. |
| 10,328,000 | B2 | 6/2019 | Sodd et al. |
| 10,377,966 | B2 | 8/2019 | Zerhusen et al. |
| 10,392,582 | B2 | 8/2019 | Zerhusen et al. |
| 10,465,048 | B2 | 11/2019 | Huddleston et al. |
| 10,471,629 | B2 | 11/2019 | Huddleston et al. |
| 10,487,293 | B2 | 11/2019 | Zerhusen et al. |
| 10,538,720 | B2 | 1/2020 | Vasquez Valdivieso et al. |
| 10,563,155 | B2 | 2/2020 | Sodd et al. |
| 10,640,731 | B2 | 5/2020 | Zerhusen et al. |
| 10,648,115 | B2 | 5/2020 | Zerhusen et al. |
| 10,655,084 | B2 | 5/2020 | Zerhusen et al. |
| 10,787,629 | B2 | 9/2020 | Panandiker et al. |
| 11,118,135 | B2 | 9/2021 | Zerhusen et al. |
| 11,142,728 | B2 | 10/2021 | Aouad |
| 11,186,803 | B2 | 11/2021 | Corona, III et al. |
| 11,186,805 | B2 | 11/2021 | Fossum et al. |
| 11,193,091 | B2 | 12/2021 | Corona, III et al. |
| 11,332,699 | B2 | 5/2022 | Zerhusen et al. |
| 2009/0137441 | A1 | 5/2009 | Chapple et al. |
| 2016/0122693 | A1* | 5/2016 | Sodd .................... C11D 17/041 512/4 |
| 2017/0260482 | A1 | 9/2017 | Vasquez Valdivieso et al. |
| 2018/0195028 | A1 | 7/2018 | Hartshorn |
| 2019/0292497 | A1 | 9/2019 | Miracle |
| 2020/0002885 | A1 | 1/2020 | Langevin |
| 2020/0032167 | A1 | 1/2020 | Qin |
| 2020/0032173 | A1 | 1/2020 | Miracle |
| 2020/0347321 | A1* | 11/2020 | Miracle ................ C11D 3/2079 |
| 2020/0347322 | A1 | 11/2020 | Miracle |
| 2020/0354652 | A1 | 11/2020 | Panandiker et al. |
| 2021/0189294 | A1 | 6/2021 | Fossum et al. |
| 2021/0355415 | A1 | 11/2021 | Williams et al. |
| 2021/0403835 | A1 | 12/2021 | Aouad |

(Continued)

FOREIGN PATENT DOCUMENTS

| | | | |
|---|---|---|---|
| EP | 0320219 | A1 * | 6/1989 |
| JP | 2022530424 | A | 6/2022 |

OTHER PUBLICATIONS

15810M PCT Search Report and Written Opinion for PCT/US2021/034394 dated Aug. 27, 2021, 12 pages.

U.S. Appl. No. 17/724,159, filed Apr. 19, 2022, to Jaden Scott Zerhusen et al.

U.S. Appl. No. 17/970,802, filed Oct. 21, 2022, to Jaden Scott Zerhusen.

(Continued)

*Primary Examiner* — Lorna M Douyon

(74) *Attorney, Agent, or Firm* — Carolyn S. Powell; Gary J. Foose

(57) ABSTRACT

A composition including a plurality of particles. The plurality of particles include: about 25% to about 99% by weight water soluble carrier; and about 0.01% to 50% by weight antioxidant. The antioxidant is dispersed in a matrix of the water soluble carrier.

17 Claims, 1 Drawing Sheet

(56) References Cited

U.S. PATENT DOCUMENTS

| | | | |
|---|---|---|---|
| 2022/0049188 | A1 | 2/2022 | Corona, III et al. |
| 2022/0049191 | A1 | 2/2022 | Fossum et al. |
| 2022/0056377 | A1 | 2/2022 | Corona, III et al. |
| 2022/0169950 | A1 | 6/2022 | Zerhusen et al. |

* cited by examiner

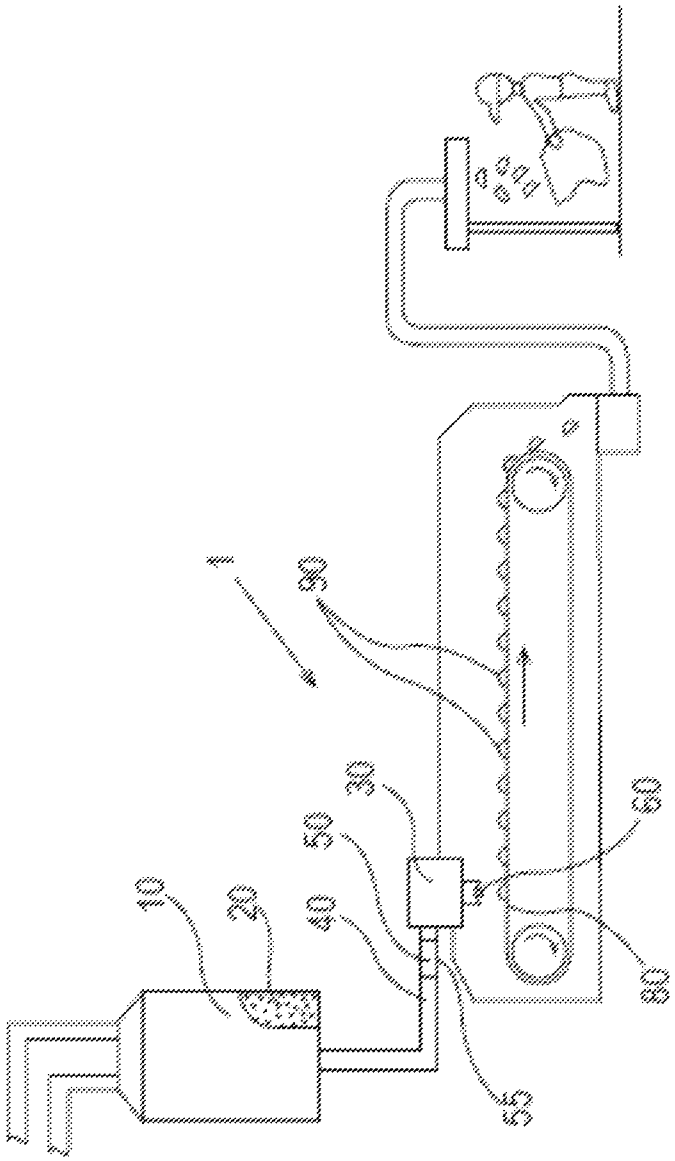

PARTICULATE LAUNDRY ADDITIVE

FIELD OF THE INVENTION

Fabric care laundry additives.

BACKGROUND OF THE INVENTION

Consumers enjoy using particulate laundry scent additives that are delivered through the wash. In particular, consumers like laundry scent additives that are packaged in a manner that enables the consumer to use a custom amount of the laundry scent additive based on the consumer's judgment of how much of the laundry scent additive is needed to provide the desired benefit. Such laundry scent additives are conveniently provided through the wash along with a fully formulated fabric care composition.

A typical particulate laundry scent additive consists of a carrier and perfume. The particles dissolve or disperse in the wash to release the perfume and perfume is deposited on the articles that are being laundered.

Although particulate laundry scent additives are effective for loading perfume onto laundered items, if the laundered articles harbor malodorous materials, the malodor may remain detectable even after the item is laundered. Malodorous materials can accumulate on the fibers of a garment even if the garment is laundered frequently. Garments comprising synthetic fibers are particularly susceptible to malodor buildup. Garments used as exercise wear commonly comprise synthetic fibers and the combination of sweat, body soil, and the like make them particularly vulnerable to malodor buildup.

With the problem of malodorous laundered articles in mind, there is a continuing unaddressed need for laundry treatment compositions that can provide for a malodor reduction benefit.

SUMMARY OF THE INVENTION

A composition comprising a plurality of particles, the plurality of particles comprising: about 25% to about 99% by weight water soluble carrier; and about 0.01% to 50% by weight antioxidant selected from:

alkylated phenols having the formula of

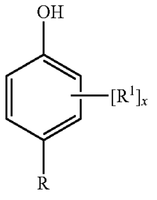

wherein $R^1$ is a $C_3$-$C_6$ branched alkyl, preferably tert-butyl;

x is 1 or 2, preferably x is 2; at least one $R^1$ is ortho to the OH group, more preferably when x is 2, both $R^1$ are ortho to the OH group;

R is selected from —OH, $C_2$-$C_{22}$ linear alkyl, $C_3$-$C_{22}$ branched alkyl, and $(C_n\text{-}H_{2n})_y(CO_2)R^2$, where the index n is 1 to 6, the index y is 0 or 1, preferably y is 1;

$R^2$ is selected from $C_1$-$C_8$ linear alkyl, $C_3$-$C_8$ branched alkyl, and $(C_mH_{2m}O)_zR^3$ where each m is independently 1 to 4, the index z is 1 to 20, $R^3$ is H or $C_1$-$C_4$ linear alkyl;

alkylated phenols having the formula of

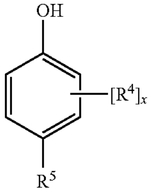

wherein x is 1 or 2, preferably 2;

each $R^4$ is independently selected from $C_1$-$C_6$ linear alkyl, and $C_3$-$C_{16}$ branched alkyl, provided when x is 2, at least one $R^4$ in the alkylated phenol is not t-butyl, preferably $C_1$-$C_6$ linear alkyl, preferably methyl; preferably one $R^4$ is $C_3$-$C_{16}$ branched alkyl, more preferably t-butyl; more preferably, one $R^4$ is methyl and the other $R^4$ is t-butyl;

wherein at least one $R^4$ is positioned on the ring ortho to a hydroxyl group, most preferably both $R^4$ are ortho to a hydroxyl group;

$R^5$ is selected from $C_1$-$C_{22}$ linear alkyl, $C_3$-$C_{22}$ branched alkyl, $(C_rH_{2r}O)_wR^9$ where each r is independently 1 to 4, the index w is 1 to 20, $R^9$ is H or $C_1$-$C_4$ linear alkyl, and $(C_n\text{-}C_{2n})_yC(O)QR^6$, where Q is independently selected from —O—, —S—, and —$NR^7$—, wherein $R^7$ is selected from H and $C_1$-$C_4$ alkyl, preferably $R^7$ is H; where the index n is 1 to 6, preferably n is 2 or 3, the index y is 0 or 1, preferably 1; more preferably $R^5$ is $(C_nH_{2n})_yC(O)QR^6$ wherein Q is —O—, n is 2 or 3, and y is 1; $R^6$ is selected from $C_1$-$C_8$ linear alkyl, $C_3$-$C_8$ branched alkyl, and $GR^8$ wherein G is a divalent organic moiety with weight from 12 to 1,443 Da, more preferably G is selected from $(CH_2)_pQ$ where the index p is from 2 to 12 and $(C_mH_{2m}O)_z$, where each m is independently 1 to 4, preferably m is 2 or 3, more preferably m is 2, the index z is 1 to 20; most preferably G is $(C_mH_{2m}O)_z$, where each m is 2, the index z is 2 to 6; $R^8$ is H, $C_1$-$C_4$ linear alkyl, $C(O)(C_nH_{2n})_yC_6H_4(R^4)_x$ OH, and mixtures thereof, wherein n, y, x and $R^4$, which are independently selected for $R^8$, are defined as above;

alkylated phenols having the formula of

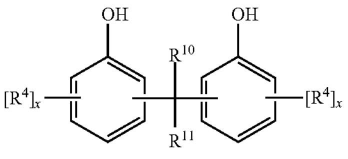

wherein each index x is independently 1 or 2;

each $R^4$ is independently selected from $C_1$-$C_6$ linear alkyl, preferably methyl, and $C_3$-$C_{16}$ branched alkyl, preferably t-butyl; wherein each $R^4$ is positioned either ortho- or para- to the OH group on its ring, and wherein the two points of attachment of the —$CR^{10}R^{11}$- bridge are ortho-, para-, or a mixture thereof, preferably both either ortho- or both para-, to the OH on the aryl rings to which the bridge is joined; $R^{10}$ and $R^{11}$ are individually selected from H and $C_1$-$C_6$ linear alkyl, preferably H and methyl, more preferably $R^{10}$ and $R^{11}$ are H;

aryl amines;

and mixtures thereof;

wherein the antioxidant is dispersed in a matrix of the water soluble carrier.

A process for treating laundry comprising the steps of: providing an article of laundry in a washing machine; dispensing the plurality of particles into the washing machine; and contacting the article of laundry during a wash sub-cycle of the washing machine with the plurality of particles.

A process for forming the plurality of particles comprising the steps of: providing a melt composition comprising the water soluble carrier and the antioxidant; passing the melt composition through one or more apertures of a distributor; and depositing the melt composition on a movable conveyor beneath the one or more apertures.

BRIEF DESCRIPTION OF THE DRAWINGS

FIG. 1. An apparatus for forming particles.

DETAILED DESCRIPTION OF THE INVENTION

A laundry treatment composition comprising a plurality of particles can be used to treat malodor using a through the wash process. In a through the wash process, the laundry treatment composition is present during the wash sub-cycle of a washing machine. A washing machine typically has a wash sub-cycle and rinse sub-cycle. Compositions designed to be delivered through the wash are convenient for the user to use. For example, the user can dispense the compositions directly to the drum of the washing machine. Moreover, the compositions are placed in the machine by the user at the time he or she places the load in the tub or starts the machine.

Delivering a meaningful malodor treatment benefit to laundry through the wash can be challenging because of the large volume of water used in a typical wash sub-cycle. Ordinarily, laundry treatment composition are diluted in the wash water to form a wash liquor. The individual components of laundry treatment compositions must be provided in the laundry treatment composition at a high enough level so that when diluted in the wash water, an adequate concentration of the individual components is present the wash water to perfume to provide the desired benefit.

A malodor benefit can be provided by including an antioxidant in the laundry treatment composition. A liquid laundry detergent composition may include an antioxidant as part of the formulation. Unfortunately, there may be an upper limit on the amount of antioxidant that can be included in a typical liquid laundry detergent composition. This upper limit can exist for liquid laundry detergent compositions that are water based for antioxidants that are not water soluble. If the antioxidant is not water soluble in the liquid laundry detergent composition, the antioxidant may fall out of suspension in the liquid laundry detergent while the liquid laundry detergent is stored in a container. Thus, liquid laundry detergent compositions may have an upper limit on the weight percent of non-water soluble antioxidant that can remain in suspension. In view of the above, there may be an upper limit on the malodor benefit that can be provided via liquid laundry detergent compositions.

Providing a malodor benefit through the rinse via an antioxidant in a liquid fabric softener product is also challenging. Liquid fabric softeners typically comprise a quaternary ammonium compound to provide a fabric softening benefit. An antioxidant added to a liquid fabric softener may phase separate from the other constituents of the liquid fabric softener composition.

Some antioxidants, such as butylated hydroxytoluene, may tend to substantially sublime over time after being deposited on fabric as compared to other antioxidants. Sublimation reduces the presence of the antioxidant on the fabric over time. As such, a relatively high weight fraction of butylated hydroxytoluene in the product might be required to deliver the desired benefit as compared to other antioxidants. Other antioxidants may overcome some of the limitations of butylated hydroxytoluene by having a lower rate of sublimation and or a higher antioxidant capacity.

The molecular weight of $C_1$-$C_8$ linear or branched alkyl esters of 3,5-bis(1,1-dimethylethyl)-4-hydroxy-benzenepropanoic acid can be greater than that for butylated hydroxytoluene, which results in more energy required for the former to transition from solid to gas than the latter. Further, the extra carbons and oxygens in the former may make the composition more hydrophobic than the latter so that the antioxidant tends to remain on the fabric rather than partition into the air. Further, the propanoic acid methyl ester functionality may result in increased hydrogen bonding between the oxygens of the ester group and cellulosic fabrics for the former relative to the latter.

Melt processes can be practical for making particles for fabric care laundry additives. Melt processing occurs at a temperature above the melt point of the particles. If water soluble polymers are used as the carrier material for the particles, the melt processing temperature will be above the melt temperature of the water soluble polymer. Some antioxidants may lose antioxidant capacity due to heat and may sublime during the manufacturing process used to manufacture the particles. As such, antioxidants that do not lose or only lose a limited amount of antioxidant capacity at the temperature at which melt processing is used are more suitable than those that lose an appreciable amount of antioxidant capacity at the temperature of melt processing. If melt processing is employed and the particles comprise perfume, it can be practical for the melt point of the antioxidant to be less than the boiling point of the perfume so that perfume loss is limited during the manufacturing process.

To provide a meaningful malodor benefit through the wash via an antioxidant, the wash liquor ideally contains about 0.1 ppm to about 20 ppm of antioxidant, optionally from about 0.5 ppm to about 15 ppm, optionally from about 1 ppm to about 10 ppm. In consideration that a typical liquid laundry detergent dose is about 20 mL to about 100 mL and a typical soluble unit dose detergent pouch is about 20 mL to about 30 mL, it can be challenging to create a wash liquor having high levels antioxidant, especially for antioxidants having low solubility.

To overcome the difficulties associating with providing an antioxidant to the wash via liquid laundry products, it can be practical to provide the antioxidant in a product that has a solid form. The product can be a composition comprising a plurality of particles. The plurality of particles can comprise about 25% to 99% by weight water soluble carrier; 0.01% to about 50% by weight , more preferably 0.05% to 2% by weight, most preferably 0.2% to 1 by weight antioxidant; and 0.2% to 20% by weight perfume. The perfume and antioxidant are dispersed in a matrix of the water soluble carrier. The antioxidant can be selected from alkylated phenols, aryl amines, and mixtures thereof.

Each of the particles can comprise one or both of the perfume and the antioxidant. For example the composition can comprise first particles that comprise the water soluble carrier and antioxidant and be free of or substantially free of perfume. And the composition can comprise second particles that comprise a water soluble carrier and perfume and be free of or substantially free of antioxidant. The individual particles of the composition can differ from one another in weight fraction of at least one of the antioxidant and the perfume. Optionally, each of the particles of the composition can comprise both the antioxidant and the perfume, which will simplify manufacture of the composition. The antioxidant and perfume can be dispersed together in the matrix of water soluble carrier.

From a user perspective, malodor and scent are coupled to one another. Thus a product that combines a malodor benefit and scent benefit is attractive. The user of such a product can customize the amount of benefit he or she wishes to achieve by selecting the desired dose. Users can readily identify laundry items that may not need as much malodor and scent benefit as others. For example, malodor and scent may be particularly problematic for exercise clothing, exercise undergarments, shirts, and towels as compared to other types of laundry items. The composition can be provided separate from the detergent composition so that the user can customize the amount of malodor and scent benefit independent of the detergent composition, the detergent composition providing for various other benefits.

Water Soluble Carrier

The particles can comprises a water soluble carrier. The water soluble carrier acts to carry the perfume and antioxidant to the wash liquor. Upon dissolution of the water soluble carrier, the antioxidant and perfume are dispersed into the wash liquor and deposited onto the laundry.

The water soluble carrier can be a material that is soluble in a wash liquor within a short period of time, for instance less than about 10 minutes.

Water soluble means that the material, carrier material, or particle is soluble or dispersible in water, and preferably has a water-solubility of at least 50%, preferably at least 75% or even at least 95%, as measured by the method set out hereafter using a glass-filter with a maximum pore size of 20 microns: 50 grams±0.1 gram of the carrier is added in a pre-weighed 400 mL beaker and 245 mL±1 mL of distilled water is added. This is stirred vigorously on a magnetic stirrer set at 600 rpm, for 30 minutes. Then, the mixture is filtered through a sintered-glass filter with a pore size as defined above (max. 20 micron). The steps are performed at a temperature of 23° C.±1.0° C. and a relative humidity of 50%±2%. The water is dried off from the collected filtrate by any conventional method, and the weight of the remaining material is determined (which is the dissolved or dispersed fraction). Then, the percentage solubility or dispersibility can be calculated.

The water soluble carrier can be selected from water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

Alkali metal salts can be, for example, selected from salts of lithium, salts of sodium, and salts of potassium, and any combination thereof. Useful alkali metal salts can be, for example, selected from alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof.

Alkaline earth metal salts can be selected from salts of magnesium, salts of calcium, and the like, and combinations thereof. Alkaline earth metal salts can be selected from alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof.

Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., a sorbate). Sorbates can be selected from sodium sorbate, potassium sorbate, magnesium sorbate, calcium sorbate, and combinations thereof.

The water soluble carrier can be or comprise a material selected from water-soluble inorganic alkali metal salt, water-soluble organic alkali metal salt, water-soluble inorganic alkaline earth metal salt, water-soluble organic alkaline earth metal salt, water-soluble carbohydrate, water-soluble silicate, water-soluble urea, and combinations thereof. The water soluble carrier can be selected from sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the water soluble carrier can be sodium chloride. In one embodiment, the water soluble carrier can be table salt.

The water soluble carrier can be or comprise a material selected from sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The water soluble carrier can be selected from water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The water soluble carrier can be selected from disaccharides, polysaccharides, silicates, zeolites, carbonates, sulfates, citrates, and combinations thereof.

The water soluble carrier can be selected from polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

The water soluble carrier can be a water soluble polymer. The water soluble polymer can be selected from $C_8$-$C_{22}$ alkyl polyalkoxylate comprising more than about 40 alkoxylate units, ethoxylated nonionic surfactant having a degree of ethoxylation greater than about 30, polyalkylene glycol having a weight average molecular weight from about 2000 to about 15000, and combinations thereof.

The water soluble carrier can be a water soluble polymer. The water soluble polymer can be a block copolymer having Formulae (I), (II), (III) or (IV), $R^1$O-(E0)x-(PO)y-$R^2$ (I), $R^1$O—(PO)x-(EO)y-$R^2$ (II), $R^1$O-(EO)o-(PO)p-(EO)q-$R^2$ (III), $R^1$O—(PO)o-(EO)p-(PO)q-$R^2$ (IV), or a combination thereof; wherein EO is a —$CH_2CH_2O$— group, and PO is a —$CH(CH_3)CH_2O$— group;

$R^1$ and $R^2$ independently is H or a C1-C22 alkyl group; x, y, o, p, and q independently is 1-100;

provided that the sum of x and y is greater than 35, and the sum of o, p and q is greater than 35;

wherein the block copolymer has a molecular weight ranging from about 3000 g/mol to about 15,000 g/mol.

The water soluble polymer cart be a block copolymer or block copolymers, for example a block copolymer based on ethylene oxide and propylene oxide selected from PLURONIC-F38, PLURONIC-F68, PLURONIC-F77, PLURONIC-F87, PLURONIC-F88, and combinations thereof. PLURONIC materials are available from BASF.

The water soluble polymer can be selected from polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; ppolyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch (suitable modified starches for use include, but are not limited to, COLLAMIDON 8805 commercially available from AGRANA Starch, Gmuend, Austria, and CTEX 06219, commercially available from Cargill B.V., Netherlands); gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the water soluble polymer can be selected from PVA; PVA copolymers; hydroxypropyl methyl cellulose (HPMC); and mixtures thereof.

The water soluble polymer can be selected from polyvinyl alcohol, modified polyvinyl alcohol, polyvinyl pyrrolidone, polyvinyl alcohol/polyvinyl pyrrolidone, polyvinyl alcohol/polyvinyl amine, partially hydrolyzed polyvinyl acetate, polyalkylene oxide, polyethylene glycol, acrylamide, acrylic acid, cellulose, alkyl cellulosics, methyl cellulose, ethyl cellulose, propyl cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, starch, modified starch, gelatin, alginates, xyloglucans, hemicellulosic polysaccharides, xylan, glucuronoxylan, arabinoxylan, mannan, glucomannan, galactoglucomannan, natural gums, pectin, xanthan, carrageenan, locus bean, arabic, tragacanth, polyacrylates, sulfonated polyacrylates, water-soluble acrylate copolymers, alkylhydroxy cellulosics, methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates, polyvinyl alcohol copolymers, hydroxypropyl methyl cellulose, and mixtures thereof.

The water soluble polymer can be an organic material. Organic water soluble polymers may provide a benefit of being readily soluble in water.

The water soluble polymer can be selected from polyethylene glycol, polypropylene glycol polyoxoalkylene, polyethylene glycol fatty acid ester, polyethylene glycol ether, starch, and mixtures thereof.

The water soluble polymer can be polyethylene glycol (PEG). PEG can be a convenient material to employ to make particles because it can be sufficiently water soluble to dissolve during a wash cycle when the particles have the range of mass disclosed herein. Further, PEG can be easily processed as melt. The onset of melt temperature of PEG can vary as a function of molecular weight of the PEG. The particles can comprise about 25% to about 94% by weight PEG having a weight average molecular weight from about 2000 to about 15000. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, alternatively from about 4,000 to about 13,000, alternatively from about 4,000 to about 12,000, alternatively from about 4,000 to about 11,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000 (which has a weight average molecular weight of 9000 even though 8000 is in the product name), or other PLURIOL product. The water soluble polymer can be a mixture of two or more polyethylene glycol compositions, one having a first weight average molecular weight (e.g. 9000) and the other having a second weight average molecular weight (e.g. 4000), the second weight average molecular weight differing from the first weight average molecular weight.

The plurality of particles can comprise about 25% to about 99% by weight water soluble carrier. The plurality of particles can comprise from about 35% to about 95%, optionally from about 50% to about 80%, optionally combinations thereof and any whole percentages or ranges of whole percentages within any of the aforementioned ranges, of water soluble carrier by weight of the plurality of particles.

The plurality of particles can comprise individual particles that comprise about 25% to about 99% by weight of individual particles water soluble carrier; about 0.01% to 50%, more preferably 0.05% to 2%, most preferably 0.2% to 1% by weight of the individual particles an antioxidant selected from alkylated phenols, aryl amines, and mixtures thereof; and about 0.2% to about 20% by weight of the individual particles perfume; wherein the perfume and the antioxidant are together dispersed in a matrix of the water soluble polymer. That is, an individual particle comprise both perfume and antioxidant.

The plurality of particles can comprise individual particles that comprise about 25% to about 99% by weight of individual particles water soluble carrier; about 0.01% to 50%, more preferably 0.05% to 2%, most preferably 0.2% to 1% by weight of the individual particles an antioxidant selected from alkylated phenols, aryl amines, and mixtures thereof; about 0.2% to about 20% by weight of the individual particles perfume, and from 0.01% to 3%, preferably from 0.02% to 2%, more preferably from 0.05% to 1%, most preferably from 0.1% to 0.5% by weight of diphenyl ether anti-microbial agent; wherein the perfume, the antioxidant, and the antimicrobial are together dispersed in a matrix of the water soluble polymer. That is, an individual particle comprise perfume, antioxidant, and antimicrobial.

The individual particles can comprise about 25% to about 99% by weight of the individual particles of PEG. Optionally, the individual particles can comprise from about 25% to about 95%, optionally from about 35% to about 95%, optionally from about 50% to about 80%, optionally combinations thereof and any whole percentages or ranges of whole percentages within any of the aforementioned ranges, of PEG by weight of the individual particles.

The water soluble polymer can comprise a material selected from: a polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; a polyethylene glycol fatty alcohol ether of formula $HO—(C_2H_4O)_s—(CH_2)_t)—CH_3$ wherein s is from about 30 to about 250 and t is from about 10 to about 30; and mixtures thereof. The polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200, can be a block copolymer or random copolymer.

The water soluble polymer can comprise: polyethylene glycol; a polyalkylene polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; and a polyethylene glycol fatty alcohol ether of formula $HO—(C_2H_4O)_s—(CH_2)_t)—CH_3$ wherein s is from about 30 to about 250 and t is from about 10 to about 30.

The water soluble polymer can comprise from about 20% to about 95% by weight of the plurality of particles or by weight of the individual particles of polyalkylene polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200.

The water soluble polymer can comprise from about 1% to about 20% by weight of the plurality of particles or by weight of the individual particles polyethylene glycol fatty acid ester of formula $(C_2H_4O)_q—C(O)O—(CH_2)_r—CH_3$ wherein q is from about 20 to about 200 and r is from about 10 to about 30.

The water soluble polymer can comprise from about 1% to about 10% by weight of the plurality of particles or by weight of the individual particles of polyethylene glycol fatty alcohol ether of formula $HO—(C_2H_4O)_s—(CH_2)_t)—CH_3$ wherein s is from about 30 to about 250 and t is from about 10 to about 30.

Individual particles can comprise from about 25% to about 99% by weight water soluble carrier. Optionally each of the particles can comprise from about 35% to about 85%, or even from about 50% to about 80%, by weight of the individual particles water soluble carrier.

Perfume

A perfume is an oil or fragrance that includes one or more odoriferous compounds, for example synthetic products of the ester, ether, aldehyde, ketone, alcohol, and hydrocarbon type. Mixtures of various odoriferous substances, which together produce an attractive fragrant note, can be used. Such perfume oils can also comprise natural mixtures of odoriferous compounds, as are available from vegetal sources.

Perfume can be a substantially water insoluble composition comprising perfume components, optionally mixed with a suitable solvent or diluent. Suitable solvents or diluents include compounds selected from ethanol, isopropanol, diethylene glycol monoethyl ether, dipropylene glycol, diethyl phthalate, triethyl citrate, and mixtures thereof.

The perfume can be provided as unencapsulated perfume. The perfume can comprise one or more pro-perfumes, also known as pro-fragrances, as part of the encapsulated perfume, part of the unecapsulated perfume, or both. The perfume can be provided in a perfume delivery system. Zeolite and cyclodextrine are examples of perfume delivery systems. The perfume can be encapsulated in starch. For example an emulsion of starch and perfume oil can be spray dried to form particles of starch having droplets of perfume dispersed within the starch matrix. Perfume delivery systems can be particulate materials or fine particulate materials that may be difficult to handle in a manufacturing environment due to the possibility that the particles may become suspended in air.

The perfume can be encapsulated perfume. Encapsulated perfume is commonly employed in laundry products. Encapsulated perfume comprises a plurality of droplets of liquid perfume each of which are encapsulated in an encapsulate shell. Perfume may be encapsulated in a water soluble or water insoluble encapsulate shell. Encapsulate shell can comprise melamine-urea-formaldehyde, melamine formaldehyde, urea formaldehyde, starch, and the like materials. The encapsulate shell wall can be a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts; and mixtures thereof. When the encapsulate shell comprises an aminoplast, the aminoplast may comprise polyurea, polyurethane, and/or polyureaurethane. The polyurea may comprise polyoxymethyleneurea and/or melamine formaldehyde. Encapsulates having an encapsulate shell comprising a polysaccharide can be practical. The encapsulate shell can be selected from chitosan, gum arabic, alginate, β-glucan, starch, starch derivatives, plant proteins, gelatin, alyssum homolocarpum seed gum, and combinations thereof.

The perfume can comprise one or more fragrances of plant origin. A fragrance of plant origin is a concentrated hydrophobic liquid containing volatile chemical compound extracted from a plant. The fragrance of plant origin can be selected from allspice berry, angelica seed, anise seed, basil, bay laurel, bay, bergamot, blood orange, camphor, caraway seed, cardamom seed, carrot seed, cassia, catnip, cedarwood, celery seed, chamomile german, chamomile roman, cinnamon bark, cinnamon leaf, citronella, clary sage, clove bud, coriander seed, cypress, elemi, eucalyptus, fennel, fir needle, frankincense, geranium, ginger, grapefruit pink, helichrysum, hop, hyssop, juniper berry, labdanum, lavender, lemon, lemongrass, lime, magnolia, mandarin, marjoram, melissa, mugwort, myrrh, myrtle, neroli, niaouli, nutmeg, orange sweet, oregano, palmarosa, patchouli, pennyroyal, pepper black, peppermint, petitgrain, pine needle, radiata, ravensara, rose, rosemary, rosewood, sage, sandalwood, spearmint, spikenard, spruce, star anise, sweet annie, tangerine, tea tree, thyme red, verbena, vetiver, wintergreen, wormwood, yarrow, ylang extra, and ylang III, and mixtures thereof.

The plurality of particles can comprise from about 0.2% to about 20% by weight of the particles perfume, optionally from about 0.2% to about 15%, optionally from about 0.2% to about 12%, optionally from about 1% to about 15%, optionally from about 2% to about 20%, optionally from about 8% to about 10% by weight perfume. For encapsulated perfume, the weight percent of perfume excludes the encapsulate shell.

Antioxidant

Particles that include antioxidant can provide for malodor reduction by retarding autoxidation events in remaining soils even after the laundry has been washed. The autoxidation can lead to the formation of malodorous materials.

The plurality of particles can comprise from about 0.01% to about 50, optionally from about 0.05% to 2%, optionally 0.2% to 1.5%, optionally 0.1% to 1%, optionally 0.2% to 1%, optionally from about 0.4% to about 1.5%, by weight antioxidant. The antioxidant can be selected from alkylated phenols, aryl amines, and mixtures thereof. Antioxidants are substances as described in Kirk-Othmer (Vol. 3, page 424) and in Ullmann's Encyclopedia (Vol. 3, page 91).

Alkylated phenols may have the general formula:

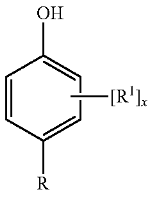

wherein $R^1$ is a $C_3$-$C_6$ branched alkyl, preferably tert-butyl; x is 1 or 2, preferably x is 2; at least one $R^1$ is ortho to the OH group, more preferably when x is 2, both $R^1$ are ortho to the OH group; R is selected from —OH, $C_2$-$C_{22}$ linear alkyl, $C_3$-$C_{22}$ branched alkyl, and $(C_nH_{2n})_y(CO_2)R^2$, where the index n is 1 to 6, preferably n is 1 to 3, more preferably n is 2, the index y is 0 or 1, preferably y is 1; $R^2$ is selected from $C_1$-$C_8$ linear alkyl, $C_3$-$C_8$ branched alkyl, and $(C_mH_{2m}O)_zR^3$ where each m is independently 1 to 4, preferably each m is independently 2 or 3, the index z is 1 to 20, $R^3$ is H or $C_1$-$C_4$ linear alkyl; preferably $R^2$ is $C_1$-$C_8$ linear alkyl or $C_3$-$C1_8$ branched alkyl, more preferably $R^2$ is $C_1$-$C_4$ linear alkyl or $C_3$-$C_8$ branched alkyl, most preferably $R^2$ is methyl.

Alkylated phenols may also have the general formula:

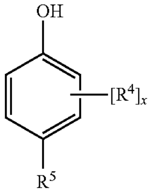

wherein x is 1 or 2, preferably 2;

each $R^4$ is independently selected from $C_1$-$C_6$ linear alkyl, and $C_3$-$C_{16}$ branched alkyl, provided when x is 2, at least one $R^4$ in the alkylated phenol is not t-butyl, preferably $C_1$-$C_6$ linear alkyl, preferably methyl; preferably one $R^4$ is $C_3$-$C_{16}$ branched alkyl, more preferably t-butyl; more preferably, one $R^4$ is methyl and the other $R^4$ is t-butyl;

wherein at least one $R^4$ is positioned on the ring ortho to a hydroxyl group, most preferably both $R^4$ are ortho to a hydroxyl group;

$R^5$ is selected from $C_1$-$C_{22}$ linear alkyl, $C_3$-$C_{22}$ branched alkyl, $(C_rH_{2r}O)_wR^9$ where each r is independently 1 to 4, the index w is 1 to 20, $R^9$ is H or $C_1$-$C_4$ linear alkyl, and $(C_nH_{2n})_yC(O)QR^6$, where Q is independently selected from —O—, —S—, and —$NR^7$—, wherein $R^7$ is selected from H and $C_1$-$C_4$ alkyl, preferably $R^7$ is H; where the index n is 1 to 6, preferably n is 2 or 3, the index y is 0 or 1, preferably 1; more preferably $R^5$ is $(C_nH_{2n})_yC(O)QR^6$ wherein Q is —O—, n is 2 or 3, and y is 1; $R^6$ is selected from $C_1$-$C_8$ linear alkyl, $C_3$-$C_8$ branched alkyl, and $GR^8$ wherein G is a divalent organic moiety with weight from 12 to 1,443 Da, preferably from 12 to 300, more preferably G is selected from $(CH_2)_pQ$ where the index p is from 2 to 12 and $(C_mH_{2m}O)_z$, where each m is independently 1 to 4, preferably m is 2 or 3, more preferably m is 2, the index z is 1 to 20; most preferably G is $(C_mH_{2n}O)_z$, where each m is 2, the index z is 2 to 6; $R^8$ is H, $C_1$-$C_4$ linear alkyl, $C(O)(C_nH_{2n})_yC_6H_4(R^4)_xOH$, and mixtures thereof, wherein n, y, x and $R^4$, which are independently selected for $R^8$, are defined as above.

Alkylated phenols may also have the general formula:

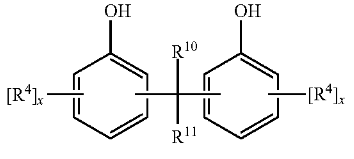

wherein each index x is independently 1 or 2;

each $R^4$ is independently selected from $C_1$-$C_6$ linear alkyl, preferably methyl, and $C_3$-$C_{16}$ branched alkyl, preferably t-butyl; wherein each $R^4$ is positioned either ortho- or para- to the OH group on its ring, and wherein the two points of attachment of the —$CR^{10}R^{11}$— bridge are ortho-, para-, or a mixture thereof, preferably both either ortho- or both para-, to the OH on the aryl rings to which the bridge is joined; $R^{10}$ and $R^{11}$ are individually selected from H and $C_1$-$C_6$ linear alkyl, preferably H and methyl, more preferably $R^{10}$ and $R^{11}$ are H.

The alkylated phenol may be a hindered phenol. As used herein, the term hindered phenol is used to refer to a compound comprising a phenol group with either (a) at least one $C_3$ or higher branched alkyl, optionally a $C_3$-$C_6$ branched alkyl, optionally tert-butyl, attached at a position ortho to at least one phenolic —OH group, or (b) substituents independently selected from $C_1$-$C_6$ alkoxy, optionally methoxy, $C_1$-$C_{22}$ linear alkyl or $C_3$-$C_{22}$ branched alkyl, optionally methyl or branched $C_3$-$C_6$ alkyl, or mixtures thereof, at each position ortho to at least one phenolic —OH group. If a phenyl ring comprises more than one —OH group, the compound is a hindered phenol provided at least one such —OH group is substituted as described immediately above.

Suitable phenols for use herein may include, but are not limited to, those selected from 3,5-bis(1,1-dimethylethyl)-4-hydroxy-benzenepropanoic acid, methyl ester; δ-tocopherol; 2,6-bis(1-methylpropyl)phenol; 2-(1,1-dimethylethyl)-1,4-benzenediol; 2,5-bis(1,1-dimethylethyl)-1,4-benzenediol; 2,6-bis(1,1-dimethylethyl)-1,4-benzenediol; 2,4-bis(1,1-dimethylethyl)-phenol; 2,6-bis(1,1-dimethylethyl)-phenol; 2-(1,1-dimethylethyl)-4-methylphenol; 2-(1,1-dimethylethyl)-4,6-dimethyl-phenol; 3,5-bis(1,1-dimethylethyl)-4-hydroxybenzenepropanoic acid, 1,1'-[2,2-bis[[3-[3,5-bis(1,1-dimethylethyl)-4-hydroxyphenyl]-1-oxopropoxy]methyl]-1,3-propanediyl] ester; 2,2'-methylenebis[6-(1,1-dimethylethyl)-4-methylphenol; 2-(1,1- dimethylethyl)-phenol; 2,4,6-tris(1,1-dimethylethyl)-phenol; 4,4'-methylenebis[2,6-bis(1,1-dimethylethyl)-phenol; 4,4',4"-[(2,4,6- trimethyl-1,3,5-benzenetriyetris(methylene)]tris[2,6-bis(1,1-dimethylethyl)-phenol]; N,N'-1,6-hexanediylbis[3,5-bis (1,1-dimethylethyl)-4-hydroxybenzenepropanamide; 3,5-bis (1,1-dimethylethyl)-4-hydroxybenzoic acid, hexadecyl ester; P-[[3,5-bis(1,1-dimethylethyl)-4-hydroxyphenyl]methylphosphonic acid, diethyl ester; 1,3,5-tris[[3,5-bis (1,1-dimethylethyl)-4-hydroxyphenyl]methyl]-1,3,5-triazine-2,4,6(1H,3H,5H)-trione; 3,5-bis(1,1-dimethylethyl)-4-hydroxybenzenepropanoic acid, 2-[3-[3,5-bis(1,1-dimethylethyl)-4-hydroxyphenyl]-1-oxopropyl]hydrazide; 4-[(dimethylamino)methyl]-2,6-bis(1,1-dimethylethyl)phenol; 4-[[4,6-bis(octylthio)-1,3,5-triazin-2-yl]amino]-2,6-bis(1,1-dimethylethyl)phenol; 3,5-bis(1,1-dimethylethyl)-4-hydroxybenzenepropanoic acid, 1,1'-(thiodi-2,1-ethanediyl) ester; 3,5-bis(1,1-dimethylethyl)-4-hydroxybenzoic acid, 2,4-bis(1,1-dimethylethyl)phenyl ester; 3,5-bis(1,1-dimethylethyl)-4-hydroxybenzenepropanoic acid, 1,1'-(1,6-hexanediyl)ester; 3-(1,1-dimethylethyl)-β-[3-(1,1-dimethylethyl)-4-hydroxyphenyl]-4-hydroxy-β-methylbenzenepropanoic acid, 1,1'-(1,2-ethanediyl) ester; 2-[[3,5-bis(1,1-dimethylethyl)-4-hydroxyphenyl]methyl]-2-butylpropanedioic acid, 1,3-bis(1,2,2,6,6-pentamethyl-4-piperidinyl) ester; 3,5-bis(1,1-dimethylethyl)-4-hydroxybenzenepropanoic acid, 1-[2-[3-[3,5-bis(1,1-dimethylethyl)-4-hydroxyphenyl]-1-oxopropoxy]ethyl]-2,2,6,6-tetramethyl-4-piperidinyl ester; 3,4-dihydro-2,5,7,8-tetramethyl-2-[(4R,8R)-4,8,12-trimethyltridecyl]-(2R)-2H-1-benzopyran-6-ol; 2,6-dimethylphenol; 2,3,5-trimethyl-1,4-benzenediol; 2,4,6-trimethylphenol; 2,3,6-trimethylphenol; 4,4'-(1-methylethylidene)-bis[2,6-dimethylphenol]; 1,3,5-tris[[4-(1,1-dimethylethyl)-3-hydroxy-2,6-dimethylphenyl]methyl]-1,3,5-triazine-2,4,6(1H,3H,5H)-trione; 4,4'-methylenebis[2,6-dimethylphenol]; 2,6-bis(1-methylpropyl)phenol; and mixtures thereof.

Additional phenols suitable for use herein may include, but are not limited to, those selected from 2-(1,1-dimethylethyl)-4-methylphenol; 2-(1,1-dimethylethyl)-4,6-dimethyl phenol; 2,4-bis(1,1-dimethylethyl)-6-methyl phenol; 2,4-bis(1,1-dimethylethyl)-6-ethyl phenol; 2,4-dimethyl-6-(1-methylpentadecyl) phenol; 2,4-dimethyl-6-(1,1,3,3-tetramethylbutyl) phenol; 4-(1,1-dimethylethyl)-2-methyl-6-(1-methylpentadecyl) phenol; 4-(1,1-dimethylethyl)-2-methyl-6-(1,1,3,3-tetramethylbutyl) phenol; 3-(1,1-dimethylethyl)-4-hydroxy-5-methyl benzenepropanoic acid, isooctyl ester; 3-(1,1-dimethylethyl)-4-hydroxy-5-methyl benzenepropanoic acid, methyl ester; 3-(1,1-dimethylethyl)-4-hydroxy-α,5-dimethyl benzenepropanoic acid, methyl ester; 3-(1,1-dimethylethyl)-4-hydroxy-α,5-dimethyl benzenepropanoic acid, ethyl ester; 3-(1,1-dimethylethyl)-4-hydroxy-α,α,5-trimethyl benzenepropanoic acid, methyl ester; 3-(1,1-dimethylethyl)-4-hydroxy-5-methyl benzenepropanoic acid, 1,1'-[1,2-ethanediylbis(oxy-2,1-ethanediyl)] ester; 3-(1,1-dimethylethyl)-4-hydroxy-α,5-dimethyl benzenepropanoic acid, 1,1'-[1,2-ethanediylbis(oxy-2,1-ethanediyl)] ester; N,N'-1,6-hexanediylbis[3-(1,1-dimethylethyl)-4-hydroxy-5-methyl benzenepropanamide; 3-(1,1-dimethylethyl)-4-hydroxy-5-methyl benzenepropanoic acid, 1,1'-[2,4,8,10-tetraoxaspiro[5.5]undecane-3,9-diylbis(2,2-dimethyl-2,1-ethanediyl)] ester; 3-(1,1-dimethylethyl)-4-hydroxy-5-methylbenzenepropanoic acid, 1,1'-[1,2-ethanediylbis(oxy-2,1-ethanediyl)] ester; 3-(1,1-dimethylethyl)-4-hydroxy-5-methylbenzenepropanoic acid, 1,1'-[2,4,8,10-tetraoxaspiro[5.5]undecane-3,9-diylbis(2,2-dimethyl-2,1-ethanediyl)] ester; and mixtures thereof.

Bis-phenols suitable for use herein may include, but are not limited to, those selected from 4,4'-methylenebis[2,6-dimethylphenol]; 4,4'-(1-methylethylidene)bis[2,6-dimethylphenol]; 4,4'-methylenebis[2-(1,1-dimethylethyl)-6-methylphenol]; 4,4'-methylenebis[2,6-bis(1,1-dimethylethyl) pheno]; 4,4'-(1-methylethylidene)bis[2,6-bis(1,1-dimethylethyl)phenol]; 4,4'-Methylenebis[6-(1,1-dimethylethyl)-2,3-dimethylphenol]; 2-[(2-Hydroxy-3,5-dimethylphenyemethyl]-4,6-dimethylphenol; 2,2'-Methylenebis[4,6-bis(1-methylethyl)phenol]; 4-(1,1-Dimethylethyl)-2-[[5-(1,1-dimethylethyl)-2-hydroxy-3-methylphenyl]methyl]-6-methylphenol]; 2,2'-Methylenebis[6-(1,1-dimethylethyl)-4-methylphenol]; 2,2'-Methylenebis[6-(1,1-dimethylethyl)-4-ethylphenol]; 2,2'-Methylenebis[6-(1,1-dimethylethyl)-4-(1-methylethyl)phenol]; 2,2'-Methylenebis[6-(1,1-dimethylethyl)-4-(1-methylpropyl) phenol]; 2,2'-Methylenebis[4-(1,1-dimethylethyl)-6-(1-methylpropyl)phenol]; 2,2'-Ethylidenebis[6-(1,1-dimethylethyl)-4-(1-methylpropyl)phenol]; 2,2'-Methylenebis[4,6-bis(1,1-dimethylethyl)phenol]; 2,2'-Ethylidenebis[4,6-bis(1,1-dimethylethyl)phenol]; 2,2'-Methylenebis[6-(1,1-dimethylethyl)-3,4-dimethylphenol]; 2,2'-Methylenebis[4-(1,1-dimethylethyl)-3,6-dimethylphenol]; 2,2'-Methylenebis[6-(1,1-dimethylethyl)-4-ethyl-3-methylphenol]; 2,2'-Methylenebis[4,6-bis(1,1-dimethylethyl)-3-methylphenol]; and mixtures thereof.

Optionally, the phenol can be $C_1$-$C_8$ linear or branched alkyl esters of 3,5-bis(1,1-dimethylethyl)-4-hydroxy-benzenepropanoic acid. An optional example of a $C_1$-$C_8$ linear or branched alkyl ester of 3,5-bis(1,1-dimethylethyl)-4-hydroxy-benzenepropanoic acid includes 3,5-bis(1,1-dimethylethyl)-4-hydroxy-benzenepropanoic acid, methyl ester (commercially available under the tradename RALOX 35 from Raschig USA, Arlington, Tex., United States). Optionally, the phenol can be a mono- or bis-ester of 3-(1,1-dimethylethyl)-4-hydroxy-5-methyl benzenepropanoic acid. An optional example of a mono- or bis-ester of 3-(1,1-dimethylethyl)-4-hydroxy-5-methyl benzenepropanoic acid includes 3-(1,1-dimethylethyl)-4-hydroxy-5-methyl benzenepropanoic acid, 1,1'-[1,2-ethanediylbis(oxy-2,1-ethanediyl)]ester (commercially available under the tradename IRGANOX 245 from BASF, Ludwigshafen, Germany) Optionally the bis-phenol can be a 2,2'-methylenebis-phenol. An optional example of a 2,2'-methylenebis-phenol includes 2,2'-methylenebis[6-(1,1-dimethylethyl)-4-methylphenol (commercially available under the tradename IRGANOX 2246 from BASF, Ludwigshafen, Germany). Additional phenolic antioxidants may be employed. Examples of suitable phenolic antioxidants may be selected from α-, β-, γ-, and δ-tocopherol; α-, β-, γ-, and δ-tocotrienol; 2,2,4-trimethyl-1,2-dihydroquinoline; tert-butyl hydroxy anisole; 6-hydroxy-2,5,7,8-tetramethylchroman-2-carboxylic acid; and mixtures thereof.

An example of an aryl amine useful as an antioxidant in particles of the present disclosure is ethoxyquin (e.g., 1,2-dihydro-6-ethoxy-2,2,4-trimethylquinoline, commercially available under the tradename RALUQUIN™, from Raschig USA, Arlington, Tex., United States). The aryl amine may be a diarylamine Diarylamines that are useful in this invention can be represented by the general formula

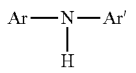

wherein Ar and Ar' are each independently selected from aromatic aryl radicals and heteroaromatic aryl radicals, wherein at least one aryl radical is substituted. Suitable diarylamines may include, but are not limited to, 4-(1,1,3,3-tetramethylbutyl)-N-[4-(1,1,3,3-tetramethylbutyl)phenyl]-benzenamine (commercially available under the tradename IRGANOX 5057 from BASF, Ludwigshafen, Germany) and 4-(1-methyl-1-phenylethyl)-N-[4-(1-methyl-1-phenylethyl)phenyl]-benzenamine (commercially available under the tradename NAUGARD 445 from Addivant, Danbury, Connecticut, United States).

There is the possibility that some of the antioxidant that has an ester group may hydrolyze, transesterify, or amidate when the particles are made by melt processing due to the elevated temperature. That may lead to low levels of impurities such as propanoic acid antioxidant, a PEGylated propanoate, or formation of an amide form from, for example, an amine present for delivering the perfume. While antioxidants are typically commercially available in high purity, they nonetheless comprise some very low level impurities that may arise from their synthesis or perhaps from degradation on storage. Some of these impurities may also serve as antioxidants. Removal of all such impurities is impractical on an industrial scale and typically there is no need to remove such impurities and they are carried over into the final product. Further, the oxidation products resulting from the intended function of the antioxidant are expected to be found in the particles.

The melt point of the antioxidant can be less than the boiling point of the perfume. That can limit loss of perfume during the manufacturing process. The melt point of the antioxidant can be less than 68 C. Such antioxidants can be practical for melt processing since a melt of the carrier and the antioxidant can be processed at a temperature that is below the boiling point of the perfume, if provided. In some aspects, antioxidants with a melting point below that of the water soluble carrier may be practical, as this enables the particles to be made at the lowest possible temperature, thereby minimizing the loss of volatile perfumes during manufacture.

Diphenyl Ether-Based Anti-Microbial Agent

The present invention may employ a diphenyl ether-based anti-microbial agent. The anti-microbial agent may be present from 0.01% to 3%, preferably from 0.02% to 2%, more preferably from 0.05% to 1%, most preferably from 0.1% to 0.5% by weight.

Preferably, the anti-microbial agent is a hydroxyl diphenyl ether. The anti-microbial agent herein can be either halogenated or non-halogenated, but preferably is halogenated. In one embodiment, the anti-microbial agent is a hydroxyl diphenyl ether of formula (I):

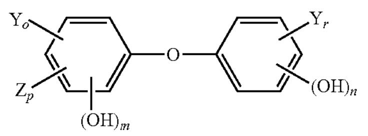

wherein:

each Y is independently selected from chlorine, bromine, or fluorine, preferably is chlorine or bromine, more preferably is chlorine, each Z is independently selected from $SO_2H$, $NO_2$, or $C_1$-$C_4$ alkyl, r is 0, 1, 2, or 3, preferably is 1 or 2, o is 0, 1, 2, or 3, preferably is 0, 1 or 2, p is 0, 1, or 2, preferably is 0, m is 1 or 2, preferably is 1, and n is 0 or 1, preferably is 0.

In the above definition for formula (I), 0 means nil. For example, when p is 0, then there is no Z in formula (I). Each Y and each Z could be the same or different. In one embodiment, o is 1, r is 2, and Y is chlorine or bromine. This embodiment could be: one chlorine atom bonds to a benzene ring while the bromine atom and the other chlorine atom bond to the other benzene ring; or the bromine atom bonds to a benzene ring while the two chlorine atoms bond to the other benzene ring.

More Preferably, the anti-microbial agent is selected from 4-4'-dichloro-2-hydroxy diphenyl ether ("Diclosan"), 2,4,4,-trichloro-2'-hydroxy diphenyl ether ("Triclosan"), and a combination thereof. Most preferably, the anti-microbial agent is 4-4'-dichloro-2-hydroxy diphenyl ether, commercially available from BASF, under the trademark name TINOSAN HP100.

Particles

The plurality of particles can comprise about 25% to 99% by weight water soluble carrier; 0.01% to about 50%, more preferably 0.05% to 2%, most preferably 0.2% to 1% by weight antioxidant; and 0.2% to 20% by weight perfume. The perfume and antioxidant can be dispersed in a matrix of the water soluble carrier. The plurality of particles can comprise from about 35% to about 95%, optionally from about 50% to about 80%, optionally combinations thereof and any whole percentages or ranges of whole percentages within any of the aforementioned ranges, of water soluble carrier.

The plurality of particles can comprise individual particles that comprise about 25% to about 99% by weight of individual particles water soluble carrier; about 0.01% to 50%, more preferably 0.05% to 2%, most preferably 0.2% to 1% by weight of the individual particles an antioxidant selected from alkylated phenols, aryl amines, and mixtures thereof; and about 0.2% to about 20% by weight of the individual particles perfume; wherein the perfume and the antioxidant are together dispersed in a matrix of the water soluble carrier. That is, an individual particle comprise both perfume and antioxidant.

The perfume can be randomly dispersed or substantially randomly dispersed in the matrix of water soluble carrier. By substantially randomly dispersed it is meant that the perfume is distributed throughout the matrix with variability in distribution of the perfume being within the variability of the mixing process used when a melt of the water soluble polymer and perfume is mixed.

The antioxidant can be randomly dispersed or substantially randomly dispersed in the matrix of water soluble carrier. By substantially randomly dispersed it is meant that the antioxidant is distributed throughout the matrix with variability in distribution of the antioxidant being within the variability of the mixing process used when a water soluble carrier and antioxidant is mixed.

The particles can each have a mass from about 1 mg to about 500 mg, alternatively from about 5 mg to about 500 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg. An individual particle may have a volume from about 0.003 $cm^3$ to about 5 $cm^3$, optionally from about 0.003 $cm^3$ to about 1 $cm^3$, optionally from about 0.003 $cm^3$ to about 0.5 $cm^3$, optionally from about 0.003 $cm^3$ to about 0.2 $cm^3$, optionally from about 0.003 $cm^3$ to about 0.15 $cm^3$. Smaller particles are thought to provide for better packing of the particles in a container and faster dissolution in the wash. The composition can comprise less than 10% by weight of particles having an individual mass less than about 10 mg. This can reduce the potential for dust.

The particles disclosed herein, in any of the embodiments or combinations disclosed, can have a shape selected from spherical, hemispherical, oblate spherical, cylindrical, polyhedral, and oblate hemisphere. The particles may be hemispherical, compressed hemispherical, or have at least one substantially flat or flat surface. Such particles may have relatively high surface area to mass as compared to spherical particles. Dissolution time in water may decrease as a function of increasing surface area, with shorter dissolution time being preferred over longer dissolution time.

The particles disclosed herein can have ratio of maximum dimension to minimum dimension from about 10 to 1, optionally from about 8 to 1, optionally about 5 to 1, optionally about 3 to 1, optionally about 2 to 1. The particles disclosed herein can be shaped such that the particles are not flakes. Particles having a ratio of maximum dimension to minimum dimension greater than about 10 or that are flakes can tend to be fragile such the particles are prone to becoming dusty. The fragility of the particles tends to decrease with decreasing values of the ratio of maximum dimension to minimum dimension.

The plurality of particles can comprises less than about 20% by weight anionic surfactant, optionally less than about 10% by weight anionic surfactant, optionally less than about 5% by weight anionic surfactant, optionally less than about 3% by weight anionic surfactant, optionally less than about 1% by weight anionic surfactant. The plurality of particles can comprise from 0 to about 20%, optionally from 0 to about 10%, optionally from about 0 to about 5%, optionally from about 0 to about 3%, optionally from about 0 to about 1% by weight anionic surfactant. Providing an antioxidant in particles that have little or no anionic surfactant can be practical because the antioxidant may not be water soluble. Upon dissolution of the particle, a portion of the antioxidant may end up within a surfactant micelle and not deposit on the laundry as intended.

The particles can comprise less than about 10% by weight water. The individual particles of the plurality of particles can have a particles onset of melt from about 40 C to about 55 C. Such particles may be stable within the supply chain from manufacturer to the consumer's household.

The particles can comprise bubbles of gas. The bubbles of gas can be spherical bubbles of gas. Since the particles can include bubbles of gas entrained therein, the particles can have a density that is less than the density or weighted average density of the constitutive solid and or liquid materials forming the particles. It can be advantageous for particles that include bubbles of gas to include an antioxidant since the bubbles of gas may contribute to oxidation reactions within the particle. Each of the particles can have a density less than about 1 $g/cm^3$. Optionally, the particles can have a density less than about 0.98 $g/cm^3$. Optionally, the particles can have a density less than about 0.95 $g/cm^3$. Since the density of a typical washing solution is about 1 $g/cm^3$, it can be desirable to provide particles that have a density less than about 1 $g/cm^3$ or even less than about 0.95 $g/cm^3$. Particles that have a density less than about 1 $g/cm^3$ can be desirable for providing for particles 90 that float in a wash liquor.

Each of the particles can have a volume and the occlusions of gas within the particles 90 can comprise between about 0.5% to about 50% by volume of the particle, or even between about 1% to about 20% by volume of the particle, or even between about 2% to about 15% by volume of the particle, or event between about 4% to about 12% by volume of the particle. Without being bound by theory, it is thought that if the volume of the occlusions of gas is too great, the particles may not be sufficiently strong to be packaged, shipped, stored, and used without breaking apart in an undesirable manner The occlusions can have an effective diameter between about 1 micron to about 2000 microns, or even between about 5 microns to about 1000 microns, or even between about 5 microns to about 200 microns, or even between about 25 to about 50 microns. In general, it is thought that smaller occlusions of gas are more desirable than larger occlusions of gas. If the effective diameter of the occlusions of gas are too large, it is thought that the particles might not be sufficiently strong to be to be packaged, shipped, stored, and used without breaking apart in an undesirable manner The effective diameter is diameter of a sphere having the same volume as the occlusion of gas. The occlusions of gas can be spherical occlusions of gas.

Process for Treating Laundry

The plurality of particles disclosed herein enable consumers to achieve a malodor benefit, in particular the wash sub-cycle. By providing a malodor benefit through the wash sub-cycle, consumers only need to dose the detergent composition and the particles to a single location, for example the wash basin, prior to or shortly after the start of the washing machine. This can be more convenient to consumers than using rinse added composition that is separately dispensed into the wash basin after the wash sub-cycle is completed, for example prior to, during, or in between rinse cycles. It can be inconvenient to use auto-dispensing features of modern upright and high efficiency machines since that requires dispensing the rinse added composition to a location other than where detergent composition is dispensed.

The process for treating an article of clothing can comprise the steps of providing an article of clothing in a washing machine. The article of clothing is contacted during the wash sub-cycle of the washing machine with a composition comprising a plurality of particles disclosed herein. The individual particles can dissolve into water provided as part of the wash sub-cycle to form a liquor. The dissolution or dispersion of the individual particles can occur during the wash sub-cycle. Optionally, the process can further comprise the step of contacting the article of clothing during the wash sub-cycle of the washing machine with a detergent composition comprising from about 3% to about 60%, optionally about 3% to about 40%, by weight anionic surfactant. The anionic surfactant can be selected from a sulphate, a sulphonate, a carboxylate, and mixture thereof. The detergent composition differs from the particles. The detergent composition can optionally be provided separate from the particles. The detergent composition can be dispensed separate from the particles.

Washing machines have at least two basic sub-cycles within a cycle of operation: a wash sub-cycle and a rinse sub-cycle. The wash sub-cycle of a washing machine is the cycle on the washing machine that commences upon first filling or partially filing the wash basin with water. A main purpose of the wash sub-cycle is to remove and or loosen soil from the article of clothing and suspend that soil in the wash liquor. Typically, the wash liquor is drained at the end of the wash sub-cycle. The rinse sub-cycle of a washing machine occurs after the wash sub-cycle and has a main purpose of rinsing soil, and optionally some benefit agents provided to the wash sub-cycle from the article of clothing.

The process can optionally comprise a step of contacting the article of clothing during the wash sub-cycle with a detergent composition comprising an anionic surfactant. Most consumers provide a detergent composition to the wash basin during the wash sub-cycle. Detergent compositions can comprise anionic surfactant, and optionally other benefit agents including but not limited to perfume, bleach, brighteners, hueing dye, enzyme, and the like. During the wash sub-cycle, the benefit agents provided with the detergent composition are contacted with or applied to the article of clothing disposed in the wash basin. Typically, the benefit agents of detergent compositions are dispersed in a wash liquor of water and the benefit agents.

During the wash sub-cycle, the wash basin may be filled or at least partially filled with water. The individual particles can dissolve or disperse into the water to form a wash liquor comprising the components of the individual particles. Optionally, if a detergent composition is employed, the wash liquor can include the components of the detergent composition and the components of the plurality of particles. The plurality of particles can be placed in the wash basin of the washing machine before the article of clothing is placed in the wash basin of the washing machine. The plurality of particles can be placed in the wash basin of the washing machine after the article of clothing is placed in the wash basin of the washing machine. The plurality of particles can be placed in the wash basin prior to filling or partially filling the wash basin with water or after filling of the wash basin with water has commenced.

If a detergent composition is employed by the consumer in practicing the process of treating an article of clothing, the detergent composition and the plurality of particles can be provided from separate packages. For instance, the detergent composition can be a liquid detergent composition provided from a bottle, sachet, water soluble pouch, dosing cup, dosing ball, or cartridge associated with the washing machine. The plurality of particles can be provided from a separate package, by way of non-limiting example, a carton, bottle, water soluble pouch, dosing cup, sachet, or the like. If the detergent composition is a solid form, such as a powder, water soluble fibrous substrate, water soluble sheet, water soluble film, water soluble film, water insoluble fibrous web carrying solid detergent composition, the plurality of particles can be provided with the solid form detergent composition. For instance, the plurality of particles can be provided from a container containing a mixture of the solid detergent composition and the plurality of particles. Optionally, the plurality of particles can be provided from a pouch formed of a detergent composition that is a water soluble fibrous substrate, water soluble sheet, water soluble film, water soluble film, water insoluble fibrous web carrying solid detergent composition.

Process for Forming Particles

The particles can be made by a process comprising multiple steps. The particles can be formed by tableting or melt processing. A melt composition can be prepared comprising about 25% to about 99% by weight water soluble carrier and about 0.05% to 50%, more preferably 0.01% to 2%, most preferably 0.2% to 1% by weight antioxidant selected from alkylated phenols, aryl amines, and mixtures thereof. The melt composition can optionally further comprise about 0.2% to about 20% by weight perfume.

The particles can be formed by using a particle making apparatus 1 (FIG. 1). A melt composition 20 can be prepared in a batch mixer 10 or continuous mixer 10 or made on a bench top by hand mixing the component materials. When the carrier is a water soluble polymer, the water soluble polymer can be heated to a temperature that is above the water soluble polymer onset of melt and below the flash point or boiling point of the perfume, if perfume is included. The antioxidant and the optional perfume can be added to the melted water soluble polymer or vice versa to form a melt composition. The water soluble polymer may be provided to already contain some portion of or all of the antioxidant.

A melt composition 20 comprising the water soluble polymer, antioxidant, and optional perfume can be passed through one or more apertures 60 and deposited on a movable conveyor 80 as an extrudate or as droplets 85. The mixture can optionally be deposited into depressions of a mold and cooled or allowed to cool so that the mixture solidifies into the particles 90. The particles can be removed from the depressions of the mold to yield the finished product. A plurality of apertures can be provided in a distributor 30. The melt composition 20 can be transported to the distributor via a feed pipe 40. Optionally a mixer 50, such as a static mixer 55, can be provided in line with the feed pipe 40. Optionally the feed pipe 40 may be insulated or provided with a heated jacket.

Optionally, the particles 90 can be formed by passing a mixture comprising the water soluble polymer, antioxidant, and perfume through one or more apertures 60 of a distributor and depositing the mixture on a movable conveyor 80 beneath the one or more apertures 60. The mixture may be solidified to form the particles 90. The mixture may be deposited on the movable conveyor 80 as an extrudate and the extrudate can be cut to form the particles 90. Or the mixture can be passed through the one or more apertures 60 to form droplets on the movable conveyor 80 and the droplets can be solidified to form the particles 90.

The perfume and antioxidant can be provided as a mixture. The perfume can be encapsulated perfume.

Optionally, a gas feed line can be included upstream of the distributor 30 to include gas within the melt composition. Downstream of the gas feed line, the melt composition 30 can be milled to break up the gas bubbles so that the melt is a gas entrained melt. The particles formed from a gas entrained melt can include gas bubbles. The gas feed line and mill can be an integrated unit, by way of nonlimiting example an Oakes Foamer (E.T. Oakes Corporation, 686 Old Willets Path, Hauppauge, NY 11788) 2MT1A continuous foamer. Optionally gas can be entrained into the melt composition 20 by mixing a gas generating material in the melt composition 20.

Test Methods

Onset of Melt Test Method

Onset of melt is determined using the Onset of Melt Test Method as follows. Differential Scanning calorimetry (DSC) is used to quantify the temperature at which the onset of melt occurs for the peak melt transition of any given composition of particles. The melt temperature measurements are made using a high quality DSC instrument with accompanying software and nitrogen purge capability, such as TA Instruments' model Discovery DSC (TA Instruments Inc./Waters Corporation, New Castle, Delaware, U.S.A.). A calibration check is conducted using an Indium standard sample. The DSC instrument is considered suitable to conduct the test if the onset of melt temperature measured for the Indium standard sample is within the range of 156.3-157.3° C.

A uniform test sample is prepared by obtaining at least 5 g of the composition, which is pulverised via milling into powder form using an analytical milling device, such as the IKA basic analytical mill model All B S1 (IKA-Werke GmbH & Co. KG, Staufen im Breisgau, Germany). The milled sample is subsequently sieved through a clean stainless steel sieve with sieve mesh size openings of nominally 1 mm in diameter (e.g. number 18 mesh size). For each sample to be tested, at least two replicate samples are independently milled and measured. A sample of the milled composition weighing approximately 5 mg is placed into the bottom of a hermetic aluminium DSC sample pan, and the sample is spread out to cover the base of the pan. A hermetic aluminium lid is placed on the sample pan, and the lid is sealed with a sample encapsulating press to prevent evaporation or weight loss during the measurement process. The DSC measurements are conducted relative to a reference standard. An empty aluminum DSC sample pan used as the reference standard, in order to measure the delta in heat adsorption of the sample-containing pan versus the empty reference pan.

The DSC instrument is set up to analyze samples using the following cycle configuration selections: Sample Purge Gas is nitrogen set at 50 mL/min; Sampling Interval is set at 0.1 s/point; Equilibrate is set at −20.00° C.; Isothermal Hold is set at 1 min. Data is collected during a single heating cycle using the settings: Ramp is set at 10.00° C./min to 90.00° C.; and Isothermal Hold is set at 90.00° C. for 1 min. A sealed sample pan containing a replicate test sample is carefully loaded into the instrument, as is an empty reference pan. The DSC analysis cycle specified above is conducted and the output data is assessed. The data acquired during the DSC heating cycle is typically plotted with Temperature on the X-axis (in ° C.) and Heat Flow normalized to sample weight (in W/g) on the Y-axis, such that melting points appear as downward (endothermic) peaks since they absorb energy.

A melt transition onset temperature is the temperature at which a deflection is first observed from the baseline previously established for the melt temperature of interest. The Peak Melt temperature is the specific temperature that requires the largest observed differential energy to transition the sample from a solid phase to a melt phase, during the specified DSC heating cycle. For the purpose of this invention, the Onset of Melt temperature is defined as the melt transition onset temperature for the Peak Melt temperature. Additional general information on the DSC technique may be found in the industry standard method ASTM D3418-03—Transition Temperatures of Polymers by DSC.

Using the DSC instrument software, two points are manually defined as the "Start and Stop Integration" baseline limits. The two points selected are on flat regions of the baseline to the left and right sides, respectively, of the melt transition peak detected. This defined area is then used to determine the peak temperature (T) which can be used to report the Peak Melt Temperature. The Onset of Melt temperature for the Peak Melt temperature is then identified by the instrument software.

The Onset of Melt temperature reported is the average result (in ° C.) from the replicate samples of the composition.

Malodor Reduction Test Method

The following method is used to test the malodor reduction benefits of a composition.

A. Preparation of 75 Grams Malodor Cocktail

Fatty acids and malodor molecules are added into 100 ml glass gar with Teflon-lined cap according to Table A and mixed well using a vortex.

TABLE A

Malodor marker composition.

| Material | CAS # | % Composition | Weight needed (g) |
|---|---|---|---|
| Iso Valeric acid | 503-74-2 | 12.00 | 9.0 |
| Undecanal | 112-44-7 | 0.20 | 0.15 |
| Undecanoic Acid | 112-37-8 | 62.80 | 47.1 |
| Skatole | 83-34-1 | 1.00 | 0.75 |
| Decanoic Acid | 334-48-5 | 22.00 | 16.5 |
| Ethyl undecanoate | 627-90-7 | 2.00 | 1.5 |

B. Preparation of Body Soil Malodor Composition

Provided the specified amount of each material according to Table B into a 200 mL glass jar with Teflon lined cap. Artificial body soil (ABS) is commercially available by Accurate Product Development; 2028 Bohlke Blvd, Fairfield, OH 45014.

TABLE B

Body soil malodor composition.

| Material | Weight (g) |
|---|---|
| Malodor cocktail (from Table A) | 17.1 |
| Artificial Body Soil (ABS) | 15.8 |

TABLE B-continued

| Body soil malodor composition. | |
|---|---|
| Material | Weight (g) |
| Di-propylene glycol monomethyl ether (CAS: 34590-94-8) | 99.9 |
| Squalene (CAS # 111-02-4) | 15.8 |

C. Preparation of Malodor Test Fabrics

Sixteen malodor test fabrics per wash load are prepared by applying 540 μl of Body soil malodor composition described in Table B to de-sized 2×5 inch white polycotton 50/50 (PCW50/50) swatches. The soil is applied evenly across the fabric using an array of 36 micropipettes each delivering 15 μl of the Body soil malodor composition. 49.8 grams of liquid detergent to be tested (TIDE free and gentle liquid detergent, available from The Procter & Gamble Company of Cincinnati, OH) is added along with 13.5 grams of a plurality of particles (comprising either (a) 100 wt % PEG8000 water soluble carrier (reference or control sample) or (b) 99.5 wt % PEG8000 and 0.5 wt % antioxidant) to a Miele 1724 washing appliance set to Express cycle; 68° F. wash cycle followed by a 68° F. rinse cycle. Tap water is used, which contains an ambient level of copper, due to copper piping systems, for example. Malodor test fabrics are washed in 7 gpg wash water with 3.9 kg, 50×50 cm clean cotton and poly-cotton ballast then dried along with four 15×25 inch cotton terry hand towels in a Maytag double stack tumble drier set on low for 20 minutes. Six of the 16 dried malodor test fabrics are selected at random and each of those six is cut into two 2×2.5 inch pieces. One of the two 2×2.5 inch pieces is placed in a 10 mL analytical GC headspace crimp vial that is sealed and allowed to equilibrate at ambient conditions before analysis. In this manner each wash load generates six analytical head space vials (six internals). Each unique wash treatment is run simultaneously in three different randomized machines (three externals) from a bank of otherwise identical machines at the same time as the control treatment, therefore accessing the same source of Tap water for all wash loads.

D. Analytical Detection of Malodor on Fabric

The malodor reduction using ABS and squalene oxidation malodor molecules are quantitatively determined by Gas Chromatography Mass Spectroscopy using an Agilent gas chromatograph 7890B equipped with a mass selective detector (5977B), a Chemstation quantitation package and a Gerstel multi-purpose sampler equipped with a solid phase micro-extraction (SPME) probe. Calibration standards of 6-methyl-5-hepten-2-one (CAS 110-93-0), Trans-2-heptenal (18829-55-5) and 3-methyl-2-butenal (107-86-8) are prepared by dissolving a known weight of these materials in light mineral oil (CAS 8020-83-5) (each material available from Sigma Aldrich).

Vials containing a uniform 2 inch by 2.5 inch piece of malodor test fabric are equilibrated greater than 12 hours before analysis. The following settings are used in the auto sampler: 80 C incubation temperature, 45 min incubation time, VT32-10 sample tray type, 22 mm vial penetration, 5 min extraction time, 54 mm injection penetration and 5 min desorption time. The following settings are used for the Front Split/Splitless inlet helium: split mode, 250 C temperature, 6.8 psi pressure, 64 mL/min total flow, 3 mL/min septum purge flow, 60:1 split ratio and 15.4 min GC run time. The follow settings are used in the oven: 35 C initial temperature, 16 C/min heating program, 250 C temperature and 2 min hold time. Based on the partition coefficients (K at 80 C) of each component, the total nmol/L of 6-methyl-5-hepten-2-one (K=3353), trans-2-heptenal (K=3434), and 3-methyl-2-butenal (K=1119) are calculated.

The values of these three measurements (in nmol/L) are added together to provide the Total ABS/Squalene Oxidation Markers (nmoles/L) for a given test leg.

E. % Malodor Reduction Oxidation Products Calculations

The % Malodor Reduction Oxidation Products is provided as a percentage comparing the reduction of the amount of selected malodor markers as provided by the test composition compared to the (nil-antioxidant) reference composition. The value is determined as follows:

$$\text{Reduction Oxidation Products}=(\text{Markers}_{ref}-\text{Markers}_{test})\times 100/\text{Markers}_{ref}$$

Values for $\text{Markers}_{ref}$ and $\text{Markers}_{test}$ are defined as follows:

$\text{Markers}_{ref}$=Mean value of 18 internal replicates for the total ABS/Squalene Oxidation Markers (nmol/L) of the fabrics washed with the formulation without antioxidant (e.g., the reference or control formulation)

$\text{Markers}_{test}$=Mean value of 18 internal replicates for the total ABS/Squalene Oxidation Markers (nmol/L) of the fabrics washed with the formulation with the tested antioxidant.

As the measured oxidation products are considered malodorous, it is believed that the greater the % reduction of oxidation products provided by a composition, the less malodorous the treated fabrics are likely to be. Therefore, greater values of % Malodor Reduction Oxidation Products are typically preferred. The compositions and processes of the present disclosure may provide a % Malodor Reduction Oxidation Products value of at least about 10%, or at least about 20%, or at least about 30%, or at least about 40%, or at least about 50%, or at least about 60%, or at least about 70%, or at least about 80%.

EXAMPLES

The examples provided below are intended to be illustrative in nature and are not intended to be limiting.

Example 1. Malodor Control of a Plurality of Particles Comprising Antioxidant vs. Particles without Antioxidant To show the malodor control effects of a plurality of particles containing antioxidants of the present disclosure, various batches of the plurality of particles were prepared incorporating either no antioxidant (control) or 0.5 wt % of an antioxidant. Preparation of particles for testing was accomplished according to the following steps: (1) PEG 9000 was placed in a glass jar and melted overnight in an 80 C oven. (2) The next morning, 250 mL glass beakers and metal spatulas (used for mixing by hand) were placed in the 80 C oven to warm. (3) A beaker was removed from the oven and placed on a paper towel (for insulation) on a balance, and the balance was tared. (4) The jar of PEG 9000 was removed from the oven and 99.5 g molten PEG9000 was poured into the glass beaker. (5) 0.5 g of the antioxidant was weighed into the glass beaker, on top of the molten PEG. (6) The glass beaker was placed on a hot plate set to 85 C and the ingredients were mixed thoroughly by hand using a warm metal spatula until the product was homogenous. (7) The molten product was poured into a silicone rubber mold to form particles with approximate size of 3 mm high×5 mm in diameter. (8) The particles were cooled to room temperature and solidified, then collected in a glass sample jar. The control product was prepared exactly as above omitting step (5).

Each sample of the plurality of particles was prepared by the same process excepting the identity and level of antioxidant, and was used as described in the Malodor Reduction Test Method, Part C and analyzed according to Part D, as described above. Results are shown in Table 1.

TABLE 1

Percent Reduction in Oxidation Markers for plurality of particles with antioxidant vs. control.

| | | Oxidation Markers (nMol/L) | | % |
|---|---|---|---|---|
| Antioxidant Name | CAS No. | Particles with Antioxidant | Particles without Antioxidant (Control) | Reduction Oxidation Markers vs. Control |
| 2,2'-methylenebis[6-(1,1-dimethylethyl)-4-methylphenol[1] | 119-47-1 | 9 | 133 | 93% |
| Benzenepropanoic acid 3,5-bis(1,1-dimethylethyl)-4-hydroxy-, methyl ester[2] | 6386-38-5 | 9 | 134 | 93% |
| 3-(1,1-dimethylethyl)-4-hydroxy-5-methylbenzenepropanoic acid, 1,1'-[1,2-ethanediylbis(oxy-2,1-ethanediyl)] ester[3] | 36443-68-2 | 13 | 113 | 88% |
| 2,4,6-tris(1,1-dimethylethyl)-phenol[4] | 732-26-3 | 13 | 101 | 87% |
| 4,4'-methylenebis[2,6-bis(1,1-dimethyl-ethyl)-phenol[5] | 118-82-1 | 45 | 99 | 55% |
| 2-(1,1-dimethyl)-4,6-dimethylphenol[6] | 1879-09-0 | 58 | 113 | 49% |
| 2-(1,1-dimethylethyl)-4-methylphenol[7] | 2409-55-4 | 55 | 101 | 46% |
| 2-(1,1-dimethylethyl)-1,4-benzenediol[8] | 1948-33-0 | 84 | 101 | 17% |
| 3,5-bis(1,1-dimethylethyl)-4-hydroxy-benzenepropanoic acid, 2-[3[3,5-bis-(1,1-dimethylethyl)-4-hydroxyphenyl]-1-oxopropyl]hydrazine[9] | 32687-78-8 | 118 | 113 | −4% |
| Benzenepropanoic acid, 3,5-bis(1,1-dimethylethyl)-4-hydroxy-, octadecyl ester[10] | 2082-79-3 | 110 | 115 | 4% |

[1]2,2'-methylenebis[6-(1,1-dimethyl)-4-methylphenol], commercially available from Sigma-Aldrich Inc., St. Louis MO, has the following structure:

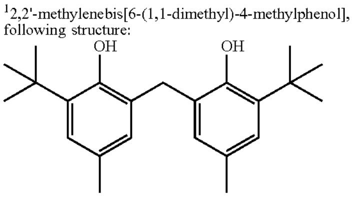

[2]Benzenepropanoic acid, 3,5-bis(1,1-dimethylethyl)-4-hydroxy-, methyl ester, commercially available from AK Scientific, Union City, CA, has the following structure:

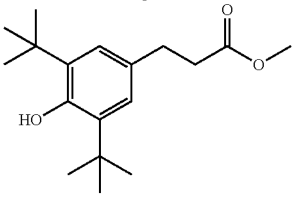

[3]3-(1,1-dimethylethyl-4-hydroxy-5-methylbenzenepropanoic acid, 1,1'-[1,2-ethanediylbis(oxy-2,1-ethanediyl)] ester, commercially available from Combi-Blocks, San Siego, CA, has the following structure:

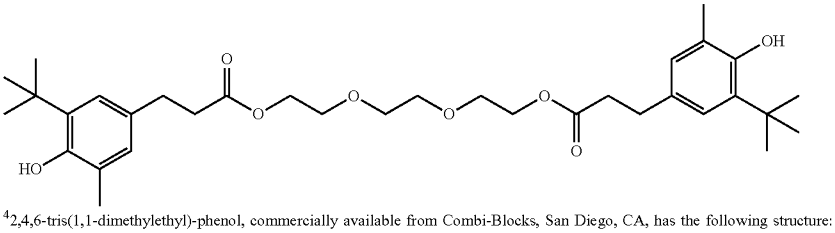

[4]2,4,6-tris(1,1-dimethylethyl)-phenol, commercially available from Combi-Blocks, San Diego, CA, has the following structure:

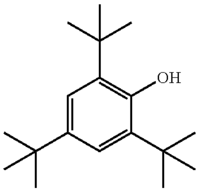 [SMILES: CC(C)(C)c1cc(C(C)(C)C)c(O)c(C(C)(C)C)c1]

TABLE 1-continued

| Percent Reduction in Oxidation Markers for plurality of particles with antioxidant vs. control. | | | | |
|---|---|---|---|---|
| | | Oxidation Markers (nMol/L) | | % |
| Antioxidant Name | CAS No. | Particles with Antioxidant | Particles without Antioxidant (Control) | Reduction Oxidation Markers vs. Control |

[5]4,4'-methylenebis[2,6-bis(1,1-dimethylethyl)-phenol], commercially available from TCI America, Portland, OR, has the following structure:

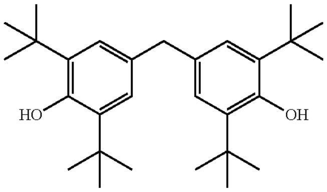 [SMILES: CC(C)(C)c1cc(Cc2cc(C(C)(C)C)c(O)c(C(C)(C)C)c2)cc(C(C)(C)C)c1O]

[6]2-(1,1-dimethylethyl)-4,6-dimethylphenol, commercially available from Combi-Blocks, San Diego, CA, has the following structure:

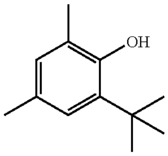

[7]2-(1,1-dimethylethyl)-4-methylphenol, commercially available from Sigma-Aldrich Inc., St. Louis, MO, has the following structure:

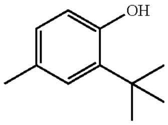

[8]2-(1,1-dimethylethyl)-1,4-benzenediol, commercially available from Sigma-Aldrich Inc., St. Louis, MO, has the following structure:

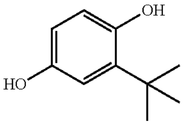

[9]Comparative example. 3,5-bis(1,1-dimethylethyl)-4-hydroxybenzenepropanoic acid, 2-[3[3,5-bis(1,1-dimethyl)-4-hydroxyphenyl]-1-oxoprophyl]hydrazine, commercially available from Combi-Blocks, San Diego, CA, has the following structure:

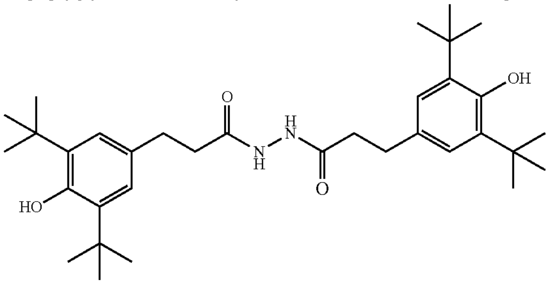

[10]Comparative Example. Benzenepropanoic acid, 3,5-bis(1,1-dimethylethyl)-4-hydroxy-, octadecyl ester, commercially available from AK Scientific, Union City, CA, has the following structure:

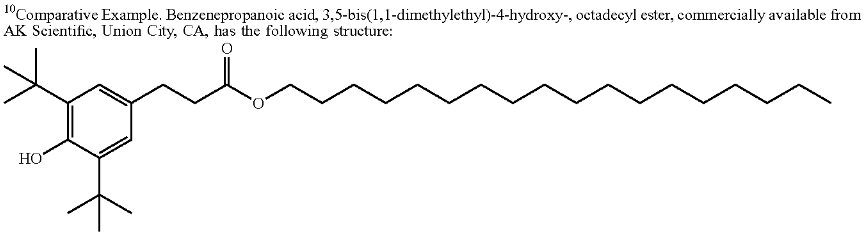

The results shown in Table 1 demonstrate a range of % Reduction in malodor markers for fabrics washed using a plurality of beads containing an antioxidant versus those washed with particles absent antioxidant. Moreover, antioxidant compounds are not equally effective, as some give little to no benefit, whereas others provide substantial reduction in malodor markers.

Example 2. Malodor Control of Inventive Example Antioxidant Particle vs. Comparative Example Sample Containing PEG Particle (without Antioxidant) and Separate Antioxidant Particles Example 2 is a comparison of malodor control between an Inventive Example A with 1 wt % of antioxidant incorporating into the particles vs. Comparative Example B containing PEG particle (free of antioxidant) and separate antioxidant particle (not incorporated into the PEG particle). The Inventive Example A was prepared by the same process described in Example 1 above, incorporating 99wt % of PEG (commercially available from BASF, molecular weight 9000) and 1 wt % of antioxidant RALOX 35 (tradename of 3,5-bis(1,1-dimethylethyl)-4-hydroxy-benzenepropanoic acid, methyl ester, commercially available from Milliken, under tradename MILLISHIELD PA35). Comparative example B was a mixture of 100% PEG particle and 100% antioxidant particle having a weight ratio of 99:1. Both PEG particle and antioxidant particle were prepared according to the process described above in Example 1, using PEG and RALOX 35 as raw materials respectively, except that for RALOX 35, in step (8), the particles were placed in 4° C. refrigerator and cooled overnight.

Example 2 used a revised method based on the Malodor Reduction Test Method described above, where the Body Soil Malodor Composition was made according to below Table B', and the washing parameters are listed in below Table C.

TABLE B'

Body soil malodor composition (for Example 2).

| Material | Weight (g) |
|---|---|
| Artificial Body Soil (ABS) | 4.4 |
| Di-propylene glycol monomethyl ether (CAS: 34590-94-8) | 33.8 |
| Squalene (CAS # 111-02-4) | 4.4 |

TABLE C

Washing Parameters.

| | Product A | Product B |
|---|---|---|
| Washing Machine | Haire FLA Front load XQG80 | |
| Wash Cycle | Mix Mode: wash 25 min/rinse 2/spin dry | |
| Dosage | Inventive Example A 12.5 g | RALOX 35 particle 0.125 g + PEG particle 12.375 g |
| Water Volume | 10 L | |
| Load Size | Total 1.7 kg include 10 pieces PW13 (cotton: polycotton PW13 80:20) | |
| Hardness | 9 gpg (Ca: Mg 4:1) | |
| HMI | Fe:Cu:Mn 0.06:0.01:0.04 | |
| Water Temperature | 25° C. | |

Results are shown in Table 2.

TABLE 2

Percent Reduction in Oxidation Markers for Inventive Example A versus Comparative Example B.

| Oxidation Markers (nMol/L) | | % |
|---|---|---|
| Inventive Example A | Comparative Example B | Reduction Oxidation Markers A vs. B |
| 368 | 1045 | 65% |

In view of the above results, a large reduction in oxidation markers for antioxidant 3,5-bis(1,1-dimethylethyl)-4-hydroxy-benzenepropanoic acid, methyl ester, occurs when the antioxidant is incorporated into the particles versus when the antioxidant is added separately.

Formulation Examples

Table 3 lists formulations for particles that could be made. As will be appreciated, many additional formulas could be prepared, and F1-F21 shown below are not meant to be limiting in any way.

TABLE 3

Potential formulations for particles.

| % Wt | F1 | F2 | F3 | F4 | F5 | F6 | F7 |
|---|---|---|---|---|---|---|---|
| PEG 8000-9000 | 82.8 | 82.8 | 63.0 | 68.9 | 95.5 | 82.0 | 82.0 |
| Antioxidant 1[a] | 1.1 | 0.7 | 0.5 | 0.5 | 0.28 | 0.15 | 0.045 |
| Perfume Encapsulate[f] | 1.28 | 0.815 | 1.28 | 3.80 | 1.62 | — | — |
| Neat Perfume Oil | 6.65 | 6.65 | 10.50 | 3.84 | — | 8.58 | — |
| Dipropylene Glycol | 5.82 | 5.82 | — | 1.58 | — | 7.44 | 5.80 |
| Modified Starch[d] | — | — | 20.0 | 18.0 | — | — | — |
| Antimicrobial[e] | — | 0.6 | — | 0.4 | — | — | — |
| Pro-perfumer[f] | — | — | 0-3.0 | — | 0.8 | 1.4 | — |
| Water and Minors | | | | Balance | | | |
| % Air by Volume of Particle | 0-5% | 15 | 21.5 | 28.5 | 5.5 | 40.0 | 35.8 |

TABLE 3-continued

| Potential formulations for particles. | | | | | | | |
|---|---|---|---|---|---|---|---|
| % Wt | F8 | F9 | F10 | F11 | F12 | F13 | F14 |
| PEG 8000 or 9000 | 82.8 | 82.8 | 63.0 | 68.9 | 95.5 | 82.0 | 82.0 |
| Antioxidant 2[b] | 1.1 | 0.7 | 0.5 | 0.5 | 0.28 | 0.15 | 0.045 |
| Perfume Encapsulate | 1.28 | 0.815 | 1.28 | 3.80 | 1.62 | — | — |
| Neat Perfume Oil | 6.65 | 6.65 | 10.50 | 3.84 | — | 8.58 | — |
| Dipropylene Glycol | 5.82 | 5.82 | — | 1.58 | — | 7.44 | 5.80 |
| Modified Starch[d] | — | — | 20.0 | 18.0 | — | — | — |
| Antimicrobial[e] | — | 0.6 | — | 0.4 | — | — | — |
| Pro-perfume | — | — | 0-3.0 | — | 0.8 | 1.4 | — |
| Water and Minors | | | | Balance | | | |
| % Air by Volume of Particle | 0-5% | 15 | 21.5 | 30.5 | 5.5 | 40.0 | 35.8 |
| % Wt | F15 | F16 | F17 | F18 | F19 | F20 | F21 |
| PEG 8000 or 9000 | 82.8 | 82.8 | 63.0 | 68.9 | 95.5 | 82.0 | 82.0 |
| Antioxidant 3[c] | 1.1 | 0.7 | 0.5 | 0.5 | 0.28 | 0.15 | 0.045 |
| Perfume Encapsulate | 1.28 | 0.815 | 1.28 | 3.80 | 1.62 | — | — |
| Neat Perfume Oil | 6.65 | 6.65 | 10.50 | 3.84 | — | 8.58 | — |
| Dipropylene Glycol | 5.82 | 5.82 | — | 1.58 | — | 7.44 | 5.80 |
| Modified Starch[d] | — | — | 20.0 | 18.0 | — | — | — |
| Antimicrobial[e] | — | 0.6 | — | 0.4 | — | — | — |
| Pro-perfume | — | — | 0-3.0 | — | 0.8 | 1.4 | — |
| Water and Minors | | | | Balance | | | |
| % Air by Volume of Particle | 0-5% | 15 | 21.5 | 30.5 | 5.5 | 40.0 | 35.8 |

[a]3,5-bis(1,1-dimethylethyl)-4-hydroxy-benzenepropanoic acid, methyl ester, commercially available from AK Scientific, Union City, CA. RALOX 35, PA 35.
[b]3-(1,1-dimethylethyl)-4-hydroxy-5-methyl benzenepropanoic acid, 1,1'-[1,2-ethanediylbis(oxy-2,1-ethanediyl)] ester, commercially available from Combi-Blocks, San Diego, CA. IRGANOX 245
[c]2,2'-methylenebis[6-(1,1-dimethylethyl)-4-methylphenol, commercially available from Sigma-Aldrich Inc., St. Louis, MO. IRGANOX 2246.
[d]CTEX 06219, commercially available from Cargill B.V., Netherlands.
[e]4-4'- dichloro-2-hydroxy diphenyl ether, commercially available from Sigma-Aldrich Inc., St. Louis, MO.
[f]Weight percent of active (either perfume encapsulate or pro-perfume).

Combinations

An example is below:

A. A composition comprising a plurality of particles, said plurality of particles comprising:
   about 25% to about 99% by weight water soluble carrier; and
   about 0.01% to 50%, more preferably 0.05% to 2%, most preferably 0.2% to 1% by weight antioxidant selected from:
   alkylated phenols having the formula of

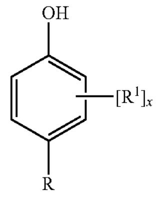

wherein $R^1$ is a $C_3$-$C_6$ branched alkyl, preferably tert-butyl;

x is 1 or 2, preferably x is 2; at least one $R^1$ is ortho to the OH group, more preferably when x is 2, both $R^1$ are ortho to the OH group;

R is selected from —OH, $C_2$-$C_{22}$ linear alkyl, $C_3$-$C_{22}$ branched alkyl, and $(C_nH_{2n})_y(CO_2)R^2$, where the index n is 1 to 6, preferably n is 1 to 3, more preferably n is 2, the index y is 0 or 1, preferably y is 1;

$R^2$ is selected from $C_1$-$C_8$ linear alkyl, $C_3$-$C_8$ branched alkyl, and $(C_mH_{2m}O)_zR^3$ where each m is independently 1 to 4, preferably each m is independently 2 or 3, the index z is 1 to 20, $R^3$ is H or $C_1$-$C_4$ linear alkyl; preferably $R^2$ is $C_1$-$C_{18}$ linear alkyl or $C_3$-$C1_8$ branched alkyl, more preferably $R^2$ is $C_1$-$C_4$ linear alkyl or $C_3$-$C_8$ branched alkyl, most preferably $R^2$ is methyl;

alkylated phenols having the formula of

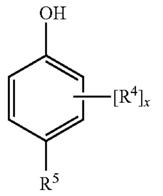

wherein x is 1 or 2, preferably 2;

each $R^4$ is independently selected from $C_1$-$C_6$ linear alkyl, and $C_3$-$C_{16}$ branched alkyl, provided when x is 2, at least one $R^4$ in the alkylated phenol is not t-butyl, preferably $C_1$-$C_6$ linear alkyl, preferably methyl; preferably one $R^4$ is $C_3$-$C_{16}$ branched alkyl, more preferably t-butyl; more preferably, one $R^4$ is methyl and the other $R^4$ is t-butyl;

wherein at least one $R^4$ is positioned on the ring ortho to a hydroxyl group, most preferably both $R^4$ are ortho to a hydroxyl group;

$R^5$ is selected from $C_1$-$C_{22}$ linear alkyl, $C_3$-$C_{22}$ branched alkyl, $(C_rH_{2r}O)_wR^9$ where each r is independently 1 to 4, the index w is 1 to 20, $R^9$ is H or $C_1$-$C_4$ linear alkyl, and $(C_nH_{2n})_yC(O)QR^6$, where Q is independently selected from —O—, —S—, and —$NR^7$—, wherein $R^7$ is selected from H and $C_1$-$C_4$ alkyl, preferably $R^7$ is H; where the index n is 1 to 6, preferably n is 2 or 3, the index y is 0 or 1, preferably 1; more preferably $R^5$ is $(C_nH_{2n})_yC(O)QR^6$ wherein Q is —O—, n is 2 or 3, and y is 1; $R^6$ is selected from $C_1$-$C_8$ linear alkyl, $C_3$-$C_8$ branched alkyl, and $GR^8$ wherein G is a divalent organic moiety with weight from 12 to 1,443 Da, preferably from 12 to 300, more preferably G is selected from $(CH_2)_pQ$ where the index p is from 2 to 12 and $(C_mH_{2m}O)_z$, where each m is independently 1 to 4, preferably m is 2 or 3, more preferably m is 2, the index z is 1 to 20; most preferably G is $(C_mH_{2m}O)_z$, where each m is 2, the index z is 2 to 6; $R^8$ is H, $C_1$-$C_4$ linear alkyl, $C(O)(C_nH_{2n})_yC_6H_4(R^4)_xOH$, and mixtures thereof, wherein n, y, x and $R^4$, which are independently selected for $R^8$, are defined as above;

alkylated phenols having the formula of

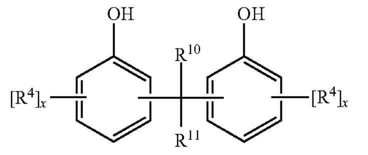

wherein each index x is independently 1 or 2;

each $R^4$ is independently selected from $C_1$-$C_6$ linear alkyl, preferably methyl, and $C_3$-$C_{16}$ branched alkyl, preferably t-butyl; wherein each $R^4$ is positioned either ortho- or para- to the OH group on its ring, and wherein the two points of attachment of the —$CR^{10}R^{11}$— bridge are ortho-, para-, or a mixture thereof, preferably both either ortho- or both para-, to the OH on the aryl rings to which the bridge is joined; $R^{10}$ and $R^{11}$ are individually selected from H and $C_1$-$C_6$ linear alkyl, preferably H and methyl, more preferably $R^{10}$ and $R^{11}$ are H;

aryl amines;

and mixtures thereof;

wherein said antioxidant is dispersed in a matrix of said water soluble carrier.

B. The composition according to Paragraph A, wherein said plurality of particles further comprise about 0.2% to about 20% by weight perfume.

C. The composition according to Paragraph B, wherein said perfume comprises encapsulated perfume.

D. The composition according to Paragraph B, wherein said perfume comprises unencapsulated perfume.

E. The composition according to any of Paragraphs B to D, wherein said perfume and said antioxidant are dispersed together in said matrix of said water soluble carrier.

F. The composition according to Paragraph A, wherein said plurality of particles is free from perfume.

G. The composition according to any of Paragraphs A to F, wherein said water soluble carrier is a water soluble polymer.

H. The composition according to Paragraph G, wherein said water soluble polymer is selected from:

polyalkylene polymer of formula H—$(C_2H_4O)_x$—$(CH(CH_3)CH_2O)_y$—$(C_2H_4O)_z$—OH wherein x is from 50 to 300, y is from 20 to 100, and z is from 10 to 200;

polyethylene glycol fatty acid ester of formula $(C_2H_4O)_q$—C(O)O—$(CH_2)_r$—$CH_3$ wherein q is from 20 to 200 and r is from 10 to 30;

polyethylene glycol fatty alcohol ether of formula HO—$(C_2H_4O)_s$—$(CH_2)_t)$—$CH_3$ wherein s is from 30 to 250 and t is from 10 to 30;

C8-C22 alkyl polyalkoxylate comprising more than 40 alkoxylate units;

polyethylene glycol having a weight average molecular weight from 2000 to 15000;

EO/PO/EO block copolymer;

PO/EO/PO block copolymer;

EO/PO block copolymer;

PO/EO block copolymer;

polypropylene glycol;

ethoxylated nonionic surfactant having a degree of ethoxylation greater than 30;

polyvinyl alcohol;

polyalkylene glycol having a weight average molecular weight from 2000 to 15000;

and mixtures thereof.

I. The composition according to Paragraph G, wherein said water soluble polymer is polyethylene glycol having a weight average molecular weight from about 2000 to about 15000.

J. The composition according to any of Paragraphs A to I, wherein said plurality of particles comprise individual particles that have a particles onset of melt from about 40 C to about 55 C.

K. The composition according to any of Paragraphs A to J, wherein said antioxidant comprises alkylated phenol and said alkylated phenol is selected from selected from a $C_1$-$C_8$ linear or $C_3$-$C_8$ branched alkyl ester of 3,5-bis(1,1-dimethylethyl)-4-hydroxy-benzenepropanoic acid, a mono- or bis-ester of 3-(1,1-dimethylethyl)-4-hydroxy-5-methyl benzenepropanoic acid; a 2,2'-methylenebis-phenol; and mixtures thereof.

L. The composition according to Paragraph K, wherein said alkylated phenol is selected from 3,5-bis(1,1-dimethylethyl)-4-hydroxy-benzenepropanoic acid, methyl ester; 3-(1,1-dimethylethyl)-4-hydroxy-5-methyl benzenepropanoic acid, 1,1'-[1,2-ethanediylbis(oxy-2,1-ethanediyl)] ester; 2,2'-methylenebis[6-(1,1-dimethylethyl)-4-methylphenol]; and mixtures thereof.

M. The composition according to any of Paragraphs A to L, wherein said plurality of particles comprises less than about 20% by weight anionic surfactant, optionally less than about 10% by weight anionic surfactant, optionally less than about 5% by weight anionic surfactant, optionally less than about 3% by weight anionic surfactant, optionally less than about 1% by weigh anionic surfactant.

N. The composition according to any of Paragraphs A to M, wherein said water soluble carrier is selected from polyalkylene oxide, polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

O. The composition according to any of Paragraphs A to N, wherein said plurality of particles further comprises a material selected from: α-, β-, γ-, and δ-tocopherol; α-, β-, γ-, and δ-tocotrienol; 2,2,4-trimethyl-1,2-dihydroquinoline; tert-butyl hydroxyanisole; 6-hydroxy-2,5,7,8-tetramethylchroman-2-carboxylic acid; and mixtures thereof.

P. The composition according to any of Paragraphs A to O, wherein said plurality of particles comprises individual particles, wherein said individual particles each have a mass from about 5 mg to about 200 mg, preferably from about 10 mg to about 100 mg, preferably from about 20 mg to about 50 mg.

Q. The composition according to any of Paragraphs A to P, wherein said plurality of particles comprises individual particles, wherein said individual particles have at least one flat surface.

R. The composition according to any of Paragraphs A to Q, wherein said plurality of particles comprise individual particles, wherein said individual particles have a density less than about 1 g/cm$^3$, optionally less than about 0.98 g/cm$^3$.

S. A process for treating laundry comprising the steps of:
providing an article of laundry in a washing machine;
dispensing said plurality of particles according to any of Paragraphs A to R into said washing machine; and
contacting said article of laundry during a wash sub-cycle of said washing machine with said plurality of particles.

T. The process according to Paragraph S further comprising a step of dispensing into said washing machine a laundry detergent comprising from about 3% to about 60% by weight anionic or nonionic surfactant.

U. The process according to Paragraph S or T, wherein about 5 g to about 50 g of said plurality of particles is dispensed into said washing machine.

V. The process according to any of Paragraphs S to U, wherein said plurality of particles is dissolved into a wash liquor within said washing machine and said antioxidant is at a level of from about 0.1 ppm to about 20 ppm.

W. A process for forming the plurality of particles according to any of Paragraphs A to R or X to AA comprising the steps of:
providing a melt composition comprising said water soluble carrier and said antioxidant;
passing said melt composition through one or more apertures of a distributor; and
depositing said melt composition on a movable conveyor beneath said one or more apertures.

X. A composition comprising a plurality of particles, said plurality of particles comprising:
about 25% to about 99% by weight water soluble carrier; and
about 0.01% to 50%, more preferably 0.05% to 2%, most preferably 0.2% to 1% by weight antioxidant, wherein said antioxidant comprises at least one of a $C_1$-$C_8$ linear or $C_3$-$C_8$ branched alkyl ester of 3,5-bis(1,1-dimethylethyl)-4-hydroxy-benzenepropanoic acid; and a mono- or bis-ester of 3-(1,1-dimethylethyl)-4-hydroxy-5-methyl benzenepropanoic acid; a 2,2'-methylenebis-phenol;
wherein said antioxidant is dispersed in a matrix of said water soluble carrier.

Y. The composition according to Paragraph X, wherein said antioxidant comprises at least one of 5-bis(1,1-dimethylethyl)-4-hydroxy-benzenepropanoic acid, methyl ester; 3-(1,1-dimethylethyl)-4-hydroxy-5-methyl benzenepropanoic acid, 1,1'-[1,2-ethanediylbis (oxy-2,1-ethanediyl)] ester; and 2,2'-methylenebisl6-(1,1-dimethylethyl)-4-methylphenoll.

Z. The composition according to Paragraph X or Y, wherein said plurality of particles further comprises from 0.01% to 3%, preferably from 0.02% to 2%, more preferably from 0.05% to 1%, most preferably from 0.1% to 0.5% by weight of diphenyl ether anti-microbial agent; wherein said diphenyl ether anti-microbial agent is preferably selected from 4-4'-dichloro-2-hydroxydiphenyl ether, 2,4,4'-trichloro-2'-hydroxydiphenyl ether, and a combination thereof; and wherein said diphenyl ether anti-microbial agent is more preferably 4-4'-dichloro-2-hydroxy diphenyl ether.

AA. The composition according to any of Paragraphs A to R, wherein said plurality of particles further comprises from 0.01% to 3%, preferably from 0.02% to 2%, more preferably from 0.05% to 1%, most preferably from 0.1% to 0.5% by weight of diphenyl ether anti-microbial agent; wherein said diphenyl ether anti-microbial agent is preferably selected from 4-4'-dichloro-2-hydroxydiphenyl ether, 2,4,4'-trichloro-2'-hydroxydiphenyl ether, and a combination thereof; and wherein said diphenyl ether anti-microbial agent is more preferably 4-4'-dichloro-2-hydroxy diphenyl ether.

BB. The process according to any of Paragraphs S to U, wherein said plurality of particles further comprises from 0.01% to 3%, preferably from 0.02% to 2%, more preferably from 0.05% to 1%, most preferably from 0.1% to 0.5% by weight of diphenyl ether anti-microbial agent; wherein said diphenyl ether anti-microbial agent is preferably selected from 4-4'-dichloro-2-hydroxydiphenyl ether, 2,4,4'-trichloro-2'-hydroxydiphenyl ether, and a combination thereof; and wherein said diphenyl ether anti-microbial agent is more preferably 4-4'-dichloro-2-hydroxy diphenyl ether.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a plurality of particles, said plurality of particles comprising:
about 25% to about 99% by weight water soluble carrier, wherein said water soluble carrier comprises polyethylene glycol having a weight average molecular weight from 2000 to 15000; and
about 0.01% to 2% by weight antioxidant, wherein said antioxidant comprises alkylated phenol and said alkylated phenol is selected from a $C_1$-$C_8$ linear or $C_3$-$C_8$ branched alkyl ester of 3,5-bis(1,1-dimethylethyl)-4-hydroxy-benzenepropanoic acid, a mono- or bis-ester of 3-(1,1-dimethylethyl)-4-hydroxy-5-methyl benzenepropanoic acid; a 2,2'-methylenebis-phenol;
and mixtures thereof; and wherein said antioxidant is dispersed in a matrix of said water soluble carrier.

2. The composition according to claim 1, wherein said plurality of particles further comprise about 0.2% to about 20% by weight perfume.

3. The composition according to claim 2, wherein said perfume and said antioxidant are dispersed together in said matrix of said water soluble carrier.

4. The composition according to claim 1, wherein said plurality of particles are free from perfume.

5. The composition according to claim 1, wherein said water soluble carrier further comprises a water soluble polymer selected from:

polyalkylene polymer of formula H—$(C_2H_4O)_x$—(CH$(CH_3)CH_2O)_y$—$(C_2H_4O)_z$—OH wherein x is from 50 to 300, y is from 20 to 100, and z is from 10 to 200;

polyethylene glycol fatty acid ester of formula $(C_2H_4O)_q$—C(O)O—$(CH_2)_r$—$CH_3$ wherein q is from 20 to 200 and r is from 10 to 30;

polyethylene glycol fatty alcohol ether of formula HO—$(C_2H_4O)_s$—$(CH_2)_t$)—$CH_3$ wherein s is from 30 to 250 and t is from 10 to 30;

$C_8$-$C_{22}$ alkyl polyalkoxylate comprising more than 40 alkoxylate units;

EO/PO/EO block copolymer;

PO/EO/PO block copolymer;

EO/PO block copolymer;

PO/EO block copolymer;

polypropylene glycol;

ethoxylated nonionic surfactant having a degree of ethoxylation greater than 30;

polyvinyl alcohol;

and mixtures thereof.

6. The composition according to claim 1, wherein said water soluble carrier is polyethylene glycol having a weight average molecular weight from about 2000 to about 15000.

7. The composition according to claim 1, wherein said antioxidant comprises mono- or bis-ester of 3-(1,1-dimethylethyl)-4-hydroxy-5-methyl benzenepropanoic acid.

8. The composition according to claim 1, wherein said alkylated phenol is selected from 3,5-bis(1,1-dimethylethyl)-4-hydroxy-benzenepropanoic acid, methyl ester; 3-(1,1-dimethylethyl)-4-hydroxy-5-methyl benzenepropanoic acid, 1,1'-[1,2-ethanediylbis(oxy-2,1-ethanediyl)]ester; 2,2'-methylenebis[6-(1,1-dimethylethyl)-4-methylphenol]; and mixtures thereof.

9. The composition according to claim 1, wherein said plurality of particles comprise less than about 20% by weight anionic surfactant.

10. The composition according to claim 1, wherein said water soluble carrier, wherein said water soluble carrier comprises polyethylene glycol having a weight average molecular weight from 2000 to 1500 sodium acetate, sodium bicarbonate, sodium chloride, sodium silicate, polypropylene glycol polyoxoalkylene, polyethylene glycol fatty acid ester, polyethylene glycol ether, sodium sulfate, starch, or mixtures thereof.

11. The composition according to claim 1, wherein said plurality of particles further comprise a material selected from: α-, β-, γ-, and δ-tocopherol; α-, β-, γ-, and δ-tocotrienol; 2,2,4-trimethyl-1,2-dihydroquinoline; tert-butyl hydroxyanisole; 6-hydroxy-2,5,7,8-tetramethylchroman-2-carboxylic acid; and mixtures thereof.

12. The composition according to claim 1, wherein said plurality of particles comprise individual particles, wherein said individual particles each have a mass from about 5 mg to about 200 mg.

13. A process for forming the plurality of particles of claim 1 comprising the steps of:

providing a melt composition comprising said water soluble carrier and said antioxidant;

passing said melt composition through one or more apertures of a distributor; and depositing said melt composition on a movable conveyor beneath said one or more apertures.

14. A process for treating laundry comprising the steps of:

providing an article of laundry in a washing machine;

dispensing said plurality of particles according to claim 1 into said washing machine; and contacting said article of laundry during a wash sub-cycle of said washing machine with said plurality of particles.

15. The process according to claim 14 further comprising a step of dispensing into said washing machine a laundry detergent comprising from about 3% to about 60% by weight anionic or nonionic surfactant.

16. The process according to claim 14, wherein about 5 g to about 50 g of said plurality of particles is dispensed into said washing machine.

17. The process according to claim 16, wherein said plurality of particles is dissolved into a wash liquor within said washing machine and said antioxidant is at a level of from about 0.1 ppm to about 20 ppm.

* * * * *